（12） United States Patent
Liu et al.

(10) Patent No.: US 9,207,780 B2
(45) Date of Patent: Dec. 8, 2015

(54) SYSTEMS AND METHODS FOR HIDING AND FINDING DIGITAL CONTENT ASSOCIATED WITH PHYSICAL OBJECTS VIA CODED LIGHTING

(71) Applicant: FUJI XEROX CO., LTD., Tokyo (JP)

(72) Inventors: Qiong Liu, Cupertino, CA (US); Hao Tang, Sunnyvale, CA (US); Patrick Chiu, Mountain View, CA (US); Mingming Fan, Charlotte, NC (US)

(73) Assignee: FUJI XEROX CO., LTD., Tokyo (JP)

( * ) Notice: Subject to any disclaimer, the term of this patent is extended or adjusted under 35 U.S.C. 154(b) by 133 days.

(21) Appl. No.: 14/164,293

(22) Filed: Jan. 27, 2014

(65) Prior Publication Data

US 2015/0212595 A1 Jul. 30, 2015

(51) Int. Cl.
*G06F 3/14* (2006.01)
*G06F 3/03* (2006.01)
*G06K 7/10* (2006.01)

(52) U.S. Cl.
CPC ............... *G06F 3/0321* (2013.01); *G06F 3/14* (2013.01); *G06K 7/10544* (2013.01); *G06K 2007/10524* (2013.01)

(58) Field of Classification Search
CPC ....................................................... G06F 3/017
See application file for complete search history.

(56) References Cited

U.S. PATENT DOCUMENTS

| | | | |
|---|---|---|---|
| 8,905,551 B1 * | 12/2014 | Worley, III | 353/79 |
| 9,069,382 B1 * | 6/2015 | Starner et al. | 1/1 |
| 2012/0206333 A1 * | 8/2012 | Kim | 345/156 |
| 2012/0249741 A1 * | 10/2012 | Maciocci et al. | 348/46 |
| 2013/0044193 A1 * | 2/2013 | Kulkarni | 348/51 |
| 2013/0169682 A1 * | 7/2013 | Novak et al. | 345/633 |
| 2013/0249811 A1 * | 9/2013 | Cao et al. | 345/173 |
| 2014/0184499 A1 * | 7/2014 | Kim | 345/156 |
| 2015/0116204 A1 * | 4/2015 | Kim | 345/156 |
| 2015/0170256 A1 * | 6/2015 | Pettyjohn et al. | 705/14.49 |

OTHER PUBLICATIONS

Alt, F., Shirazi, A., Kubitza, I., Schmidt, A. Interaction Techniques for Creating and Exchanging Context with Public Displays. In Proc. CHI'13. 1709-1718.
Emgu CV. http://www.emgu.com/wiki/index.php/Main_Page, visited on Mar. 9, 2014.

(Continued)

*Primary Examiner* — Ryan A Lubit
(74) *Attorney, Agent, or Firm* — Pavel I. Pogodin, Esq.; TransPacific Law Group

(57) ABSTRACT

A method involving: designating, based on an instruction received from a user, an area within an illumination field of a projector; using the projector to project a light encoded with coordinate information; receiving a content or a content information from the user; associating, using the processing unit, the designated area within an illumination field of the projector with the content or the content information received from the user; detecting the light encoded with the coordinate information using a mobile device positioned within the illumination field of the projector; determining a position of the mobile device within the illumination field of the projector based on the detected light encoded with the coordinate information; and causing, on condition that the determined position of the mobile device is within the designated area, the mobile device to display the content.

19 Claims, 14 Drawing Sheets

(56) References Cited

OTHER PUBLICATIONS

Harrison, Chris and Hudson, Scott E. Scratch Input: Creating Large, Inexpensive, Unpowered and Mobile finger Input Surfaces. In Proc. UIST '08. 205-208.

Harrison, C., Ian, D. Morris, D. Skinput: Appropriating the Body as an Input Surface. In Proc. CHI '10. 453-462.

Ishii, H. and Ullmer, B. Tangible bits: towards seamless interfaces between people, bits and atoms. In Proc. CHI'97. 234-241.

Jones, B., Benko, H., Ofek, E., Wilson, A. IllumiRoom: Peripheral Projected Illusions for Interactive Experiences. In Proc. CHI'13. 869-878.

Krevelen, D.W.F. and Poelman, R. A Survey of Augmented Reality Technologies, Applications and Limitations. International Journal of Virtual Reality, 2010, 9(2):1-20.

Lee, J., Dietz, P., Aminzade, D., and Hudson, S. "Automatic Projector Calibration using Embedded Light Sensors", In Proc. UIST'04. 123-126.

Lee, J., Hudson, S., Dietz, P. Hybrid Infrared and Visible Light Projection for Location Tracking. In Proc. UIST'07. 57-60.

Lee, J., Hudson, S., Summet, J., and Dietz, P. Moveable Interactive Projected Displays Using Projector Based Tracking, In Proc. UIST'05. 63-72.

Mistry, P., Maes, P. and Chang, L. WUW—wear Ur world: a wearable gestural interface. Ext. Abstracts CHI'09.4111-4116.

Girgensohn, A., Shipman, F., Wilcox, L., Liu, Q., Liao, C., Oneda, Y. A Tool for Authoring Unambiguous Links from Printed Content to Digital Media. In Proc. MM'11. 1561-1564.

Liu, X., Corner, M., Shenoy, P. Ferret: RFID Localization for Pervasive Multimedia. In Proc. Ubicomp'06.

Nirjon, S., Stankovic, J. Kinsight: Localizing and Tracking Household Objects using Depth-Camera Sensors. In Proc. of Distributed Computing in Sensor Systems (DCOSS)'12.

Raskar. R. et al. RFIG lamps: interacting with a self-describing world via photosensing vireless tags and projectors. In Proc. SIGGRAPH'04. 406-415.

Schmidt, D., Molyneaux, D., and Cao, X. PICOntrol: using a handheld projector for direct control of physical devices through visible light. In Proc. UIST'12. 379-388.

Want, R., Fishkin, K., Gujar, A., Harrison, B. Bridging Physical and Virtual Worlds with Electronic Tags. In Proc. CHI'99. 370-377.

White, S., Feng, D., and Feiner, S. Interaction and Presentation techniques for Shake Menus in Tangible Augmented Reality. In Proc. ISMAR'09. 39-48.

Woo, G., Lippman, A., Raskar, R. VRCodes: Unobtrusive and active visual codes for interaction by exploiting rolling shutter. In Proc. ISMAR'12. 59-64.

Yang, X., Liao, C., Liu, Q. MixPad: Augmenting Paper with Mice &Keyboards for Bimanual, Cross-media and Fine-grained Interaction with Documents. In Proc. MM'12. 1145-1148.

\* cited by examiner

SYSTEMS AND METHODS FOR HIDING AND FINDING DIGITAL CONTENT ASSOCIATED WITH PHYSICAL OBJECTS VIA CODED LIGHTING

BACKGROUND OF THE INVENTION

1. Technical Field

The disclosed embodiments relate in general to systems and methods for associating content with physical objects and retrieving the so associated content and, more specifically, to systems and methods for using coded lighting for hiding and finding digital content associated with physical objects.

2. Description of the Related Art

Physical objects are tangible and can be seen, heard, touched and felt. Many of them also have hidden aspects that cannot be directly sensed such as history, maintenance schedule, users' opinions etc. The extra info may be important for people to interact with these objects. For example, when a family member feed fishes in a tank, other family members shouldn't overfeed these fishes after that feeding. If a family member waters a moisture sensitive plant on a certain day, other family members shouldn't water too much or too less after that day. There are works attaching visual codes (e.g. QR code, specific designed visual code, and RFID) on or around physical objects to enrich their contents. Such approaches are intrusive, and easily distract users' attention as users have to intentionally look around for the tags. On the other hand, recognizing the objects by means of computer vision techniques is highly affected by texture of objects and light condition of the environment.

Therefore, the conventional methods for associating information with physical objects are either intrusive or lack requisite reliability. Thus, new and improved systems and methods are needed that would enable users to associate invisible information with physical objects in a non-intrusive manner for subsequent retrieval by the same or a different user.

SUMMARY OF THE INVENTION

The embodiments described herein are directed to systems and methods that substantially obviate one or more of the above and other problems associated with the conventional technology for associating content with various objects and retrieving the associated content.

In accordance with one aspect of the embodiments described herein, there is provided a computer-implemented method performed in connection with a computerized system incorporating a processing unit, a network interface, a memory and a projector, the computer-implemented method involving: designating, based on an instruction received from a user, an area within an illumination field of the projector; using the projector to project a light encoded with coordinate information, wherein the light encoded with the coordinate information is projected within the illumination field of the projector; receiving a content or a content information from the user; associating, using the processing unit, the designated area within the illumination field of the projector with the content or the content information received from the user; detecting the light encoded with the coordinate information using a mobile device positioned within the illumination field of the projector; determining a position of the mobile device within the illumination field of the projector based on the detected light encoded with the coordinate information; and causing, on condition that the determined position of the mobile device is within the designated area, the mobile device to display the associated content.

In one or more embodiments, the designated area corresponds to a physical object located within the illumination field of the projector and wherein the associated content is related to the physical object.

In one or more embodiments, the physical object is an artwork and wherein the associated content is related to the artwork.

In one or more embodiments, the physical object is a plant or an animal and wherein the associated content is related to caring for the plant or the animal.

In one or more embodiments, the physical object is an article offered for sale and wherein the associated content comprises sales information related to the article.

In one or more embodiments, the content information includes a location of the content.

In one or more embodiments, the light encoded with the coordinate information comprises, for each pixel or a group of pixels of the projector, a timed sequence of light pulses, the sequence of the light pulses being encoded the coordinate information of the corresponding pixel or the corresponding group of pixels.

In one or more embodiments, the light encoded with the coordinate information is detected using a camera of the mobile device.

In one or more embodiments, the light encoded with the coordinate information is detected using a luminosity sensor disposed on or about the mobile device.

In one or more embodiments, designating the area comprises placing a second mobile device within the area within the illumination field of the projector, detecting the light encoded with the coordinate information using the second mobile device, and designating the area based on the detected light encoded with the coordinate information.

In one or more embodiments, designating the area comprises acquiring an image of the illumination field of the projector using a camera, displaying the acquired image to the user and receiving from the user a selection of the designated area within the illumination field of the projector.

In one or more embodiments, designating the area further comprises converting a position of the designated area in a first coordinate system of the camera into the position of the designated area in the a second coordinate system of the projector.

In one or more embodiments, the method further comprises storing information on the designated area and the associated content information in an environment configuration file.

In one or more embodiments, the method further comprises transmitting the environment configuration file to the mobile device.

In one or more embodiments, the method further comprises, based on a second instruction received from the user, updating the content or the content information associated with the designated area.

In one or more embodiments, updating the content or the content information associated with the designated area comprises receiving from a second mobile device an updated environment configuration file and storing the received updated environment configuration file.

In one or more embodiments, the method further comprises repeatedly additionally determining the position of the mobile device and causing the mobile device to stop displaying the associated content when the determined position of the mobile device is outside of the designated area.

In accordance with another aspect of the embodiments described herein, there is provided a non-transitory computer-readable medium embodying a set of computer-executable instructions, which, when executed in connection with a computerized system comprising a processing unit, a network interface, a memory and a projector having an illumination field, cause the computerized system to perform a method involving: using the projector to project a light encoded with coordinate information indicative of a coordinate within the illumination field; storing, in the memory, a plurality of areas within the illumination field, each area being associated with a content; determining a position of a mobile device within the illumination field, by detecting the light and decoding the coordinate information encoded within the light; and causing, on condition that the position is within any of the plurality of areas, the mobile device to display the associated content.

In one or more embodiments, the designated area corresponds to a physical object located within the illumination field of the projector and wherein the associated content is related to the physical object.

In one or more embodiments, the physical object is an artwork and wherein the associated content is related to the artwork.

In one or more embodiments, the physical object is a plant or an animal and wherein the associated content is related to caring for the plant or the animal.

In one or more embodiments, the physical object is an article offered for sale and wherein the associated content comprises sales information related to the article.

In one or more embodiments, the content information comprises a location of the content.

In one or more embodiments, the light encoded with the coordinate information comprises, for each pixel or a group of pixels of the projector, a timed sequence of light pulses, the sequence of the light pulses being encoded the coordinate information of the corresponding pixel or the corresponding group of pixels.

In one or more embodiments, the light encoded with the coordinate information is detected using a camera of the mobile device.

In one or more embodiments, the light encoded with the coordinate information is detected using a luminosity sensor disposed on or about the mobile device.

In one or more embodiments, designating the area comprises placing a second mobile device within the area within the illumination field of the projector, detecting the light encoded with the coordinate information using the second mobile device, and designating the area based on the detected light encoded with the coordinate information.

In one or more embodiments, designating the area comprises acquiring an image of the illumination field of the projector using a camera, displaying the acquired image to the user and receiving from the user a selection of the designated area within the illumination field of the projector.

In one or more embodiments, designating the area further comprises converting a position of the designated area in a first coordinate system of the camera into the position of the designated area in the a second coordinate system of the projector.

In one or more embodiments, the method further comprises storing information on the designated area and the associated content information in an environment configuration file.

In one or more embodiments, the method further comprises transmitting the environment configuration file to the mobile device.

In one or more embodiments, the method further comprises, based on a second instruction received from the user, updating the content or the content information associated with the designated area.

In one or more embodiments, updating the content or the content information associated with the designated area comprises receiving from a second mobile device an updated environment configuration file and storing the received updated environment configuration file.

In one or more embodiments, the method further comprises repeatedly additionally determining the position of the mobile device and causing the mobile device to stop displaying the associated content when the determined position of the mobile device is outside of the designated area.

In accordance with yet another aspect of the embodiments described herein, there is provided a computerized system incorporating a processing unit, a network interface, a projector and a memory storing a set of instructions, the set of instructions including instructions for: designating, based on an instruction received from a user, an area within an illumination field of the projector; using the projector to project a light encoded with coordinate information, wherein the light encoded with the coordinate information is projected within the illumination field of the projector; receiving a content or a content information from the user; associating, using the processing unit, the designated area within the illumination field of the projector with the content or the content information received from the user; detecting the light encoded with the coordinate information using a mobile device positioned within the illumination field of the projector; determining a position of the mobile device within the illumination field of the projector based on the detected light encoded with the coordinate information; and causing, on condition that the determined position of the mobile device is within the designated area, the mobile device to display the associated content.

In one or more embodiments, the designated area corresponds to a physical object located within the illumination field of the projector and wherein the associated content is related to the physical object.

In one or more embodiments, the physical object is an artwork and wherein the associated content is related to the artwork.

In one or more embodiments, the physical object is a plant or an animal and wherein the associated content is related to caring for the plant or the animal.

In one or more embodiments, the physical object is an article offered for sale and wherein the associated content comprises sales information related to the article.

In one or more embodiments, the content information comprises a location of the content.

In one or more embodiments, the light encoded with the coordinate information comprises, for each pixel or a group of pixels of the projector, a timed sequence of light pulses, the sequence of the light pulses being encoded the coordinate information of the corresponding pixel or the corresponding group of pixels.

In one or more embodiments, the light encoded with the coordinate information is detected using a camera of the mobile device.

In one or more embodiments, the light encoded with the coordinate information is detected using a luminosity sensor disposed on or about the mobile device.

In one or more embodiments, designating the area comprises placing a second mobile device within the area within the illumination field of the projector, detecting the light encoded with the coordinate information using the second mobile device, and designating the area based on the detected light encoded with the coordinate information.

In one or more embodiments, designating the area comprises acquiring an image of the illumination field of the projector using a camera, displaying the acquired image to the user and receiving from the user a selection of the designated area within the illumination field of the projector.

In one or more embodiments, designating the area further comprises converting a position of the designated area in a first coordinate system of the camera into the position of the designated area in the a second coordinate system of the projector.

In one or more embodiments, the set of instructions further comprises instructions for storing information on the designated area and the associated content information in an environment configuration file.

In one or more embodiments, the set of instructions further comprises instructions for transmitting the environment configuration file to the mobile device.

In one or more embodiments, the set of instructions further comprises instructions for, based on a second instruction received from the user, updating the content or the content information associated with the designated area.

In one or more embodiments, updating the content or the content information associated with the designated area comprises receiving from a second mobile device an updated environment configuration file and storing the received updated environment configuration file.

In one or more embodiments, the method further comprises repeatedly additionally determining the position of the mobile device and causing the mobile device to stop displaying the associated content when the determined position of the mobile device is outside of the designated area.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

Figure 1:
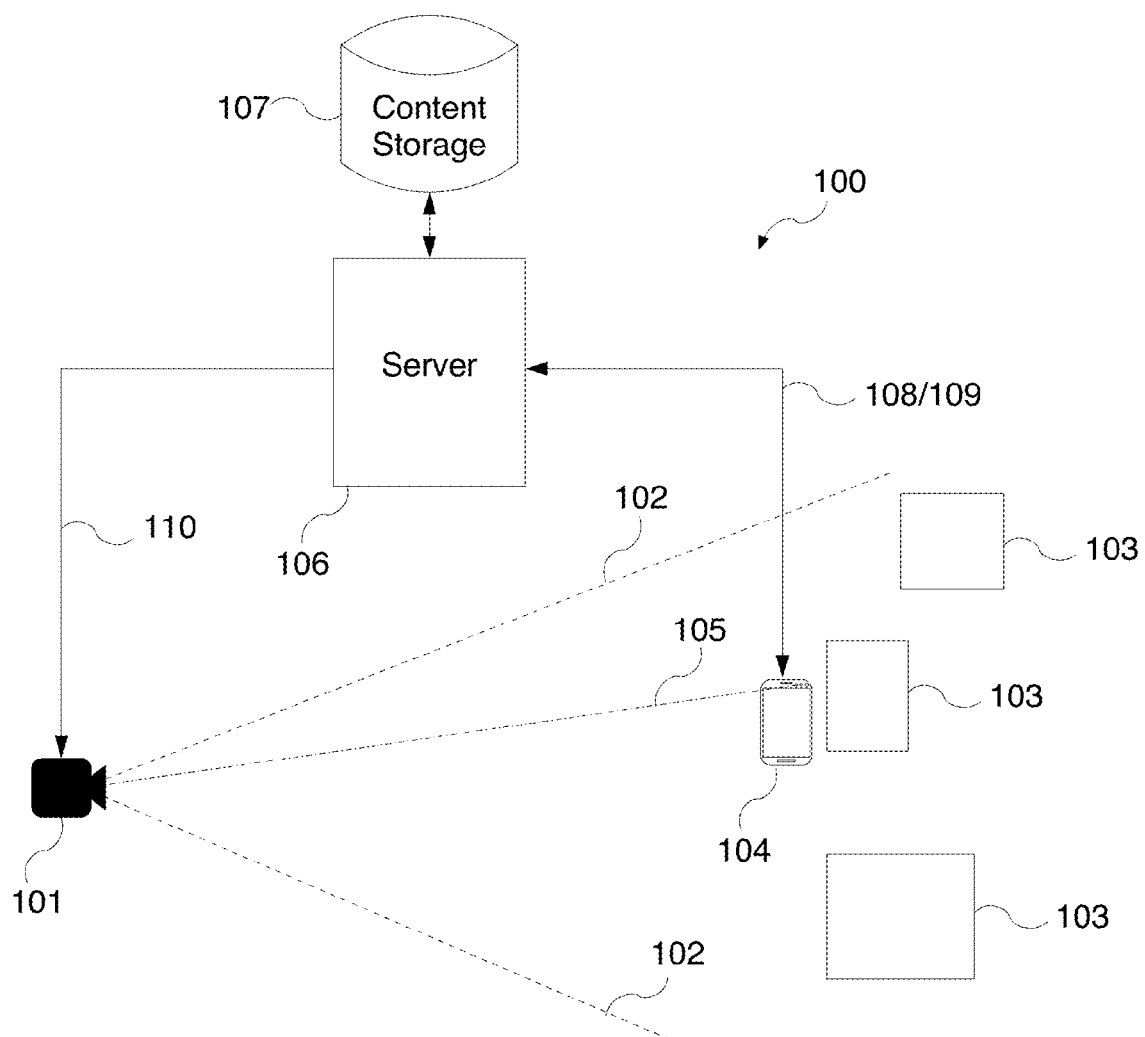
FIG. 1 illustrates an exemplary embodiment of a computerized system for associating content with various physical objects and subsequently retrieving and/or updating the associated content.

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

Exemplary System for Content Association and Retrieval

In accordance with one aspect of the embodiments described herein, there is provided a computerized system and a computer-implemented method for associating ("hiding") digital content with various physical objects and subsequently retrieving ("finding") and/or updating the associated digital content. In one or more embodiments, the system and method enables users to "hide" invisible information on physical objects and wait for the "target person" to "find" the information or "exchange" information. The described embodiments of the system and method present digital contents at the right time in a nonintrusive way and make the interaction among "hider" and "finder" more enjoyable. The described embodiments were used to create three representative applications that meet heightened usability design requirements, including museum assistant, indoor plants/fish care-giving and shopping assistant.

As would be appreciated by persons of ordinary skill in the art, in order to enable the user to "hide" and "find" information on physical objects, the system needs to identify the specific physical object that the user is interested in without distracting users' attention. To this end, there is provided a coded light based localization algorithm, which can detect a light sensor's location 80 times per second with pixel level accuracy. By attaching a light sensor on a user's mobile device, the system can determine the mobile device's location.

In one or more embodiments, the localization technique used herein does not attach physical tags (e.g. RFID, paper QR Code) to physical objects. In addition, it has minimal requirements to the users. In one embodiment, the localization system only needs a projector and a light sensor. In one embodiment, for fast location discovery, an external light sensor is attached to mobile phone of a user. In another embodiment, the same functionality may be implemented using an existing light sensor provided on the user's mobile device (mobile phones from major manufacturers already have a light sensor in the front side). Furthermore, the described technique does not distract user's attention. The projecting area is solid light gray to human perception and well merges with environment. Therefore it has no obvious visual distraction for users. Last, the location discovery is super-fast and accurate: 80 positions per second with pixel level accuracy.

As would be appreciated by persons of ordinary skill in the art, ideally, the performance of the computerized system and a computer-implemented method for associating content with various physical objects and subsequently retrieving and/or updating the associated content should be independent of the external appearance of the target physical objects. The digital content associated by users with the physical objects should meet the informational needs of the users that the physical objects themselves cannot. For instance, the extensive introduction about artwork's author life experience normally does not come with the artworks themselves, thus associating such digital content with the physical artwork would satisfy visitors' informational needs. In addition, updating of the associated digital contents should be easy and capable of being performed in real-time.

In one or more embodiments, the operation of the computerized system and a computer-implemented method for associating content with various physical objects and subsequently retrieving and/or updating the associated content does not depend on the appearance of the target physical object. In one or more embodiments, the updating of the associated digital content may be performed in real time. In one or more embodiments, the association between the physical object and the digital content is maintained by a web server, thus whenever the producer updates the contents, the information consumer could get the up-to-date contents immediately.

As would be appreciated by persons of ordinary skill in the art, physical objects are the major ones users interact with and should have users' major attentions. Digital contents are assistive and should not occupy the major attention of the user. Therefore, in terms of consumer's attention, the digital contents should appear when the consumer shows the need for such content and should disappear when consumer is no long interested in the content. Additionally, the way of presenting digital content should be nonintrusive and should not break the "magic circle" that the user is currently in. In this sense, conventional content delivery systems utilizing the RFID and QR codes well known to persons of ordinary skill in the art are deficient, because they require consumers to interrupt their current activity and specifically look for such codes in order to retrieve the associated content.

In one or more embodiments of the described system, the digital content is presented to the user using user's mobile device. For example, user can show his or her interest in the digital content associated with a physical object by taking his or her phone from a pocket and putting it close to the target physical object. The system is configured to automatically detect the aforesaid action by the user and immediately deliver the digital content associated with the target object to the mobile device of the user. When the user is no longer interested in the digital content, the user moves the mobile phone away, and upon detection of said user's action, the described system will cause the digital contents to immediately automatically disappear from user's mobile device.

FIG. 1 illustrates an exemplary embodiment of a computerized system 100 for associating digital content with various physical objects and subsequently retrieving and/or updating the associated digital. In the embodiment shown in FIG. 1, a projector 101 illuminates multiple physical objects 103 within its illumination field 102. In one or more embodiments, the projector 101 is designed to illuminate the physical objects 103 using coded lighting. Specifically, the light emitted by the projector 101 is encoded with the appropriate coordinate information of the corresponding pixel or a group of pixels within the projector illumination field 102. In one or more embodiments, the coordinate information is encoded in the illumination light of the projector 101 in a form of timed light pulses carrying information of the respective pixel coordinates. In one or more embodiments, the system 100 may include two or more projectors 101 with their illumination fields 102 stitched together or their coded light signals time-multiplexed.

To identify the object of interest to the user, the user positions a mobile device 104 in front of the target object. The light sensor (not shown) of the so positioned mobile device 104 receives a coded light ray 105 from the projector 101. In one or more embodiments, the aforesaid light sensor may be the camera unit of the mobile device 104. In another embodiment, a dedicated luminosity sensor may be used.

In one or more embodiments, the light emitted by the projector 101 is coded with the coordinates of the corresponding pixel within the illumination field of view of the projector 101. The light sensor of the user's mobile device 104 detects the coded light 105 from the projector 101 and the respective pixel coordinates are extracted from the detected light signal. In one or more embodiments, the coded light 105 may be detected by the conventional camera of the user's mobile device 104 or by a specialized luminosity sensor. Based on the coordinate information extracted from the detected light signal, the mobile application running on the user's mobile device 104 identifies the physical object closest to the user's mobile device 104 and the location of the digital associated with this object. To this end, at startup, the mobile application downloads from the server 106 an environment configuration file containing information on the positions of the physical objects in the environment as well as the location of the associated digital content. Subsequently, in one or more embodiments, the mobile device 104 may send a request 108 to the server 106, the request including the identity (location) information of the associated digital content. In one or more embodiments, the aforesaid request is an HTTP protocol request sent over a computer network.

In response, the server 106 retrieves, based on the digital content identity information contained in the received request, the digital associated with the object of interest to the user from a digital content storage 107. In one or more embodiments, the digital content storage 107 is a database, such as a relational database system or any now known or later developed design. The retrieved digital content 109 is then sent to the user's mobile device 104 via the network. Finally, the software residing on the server 106 may send control signals 110 to projector 101 to control the illumination of the objects 103.

It should be noted that many variations of the above-described process are possible. For example, the mobile application may transmit the received coordinate information to the server 106 and the server 106 itself may perform the object identification and digital content retrieval. In another embodiment, the mobile application may identify the object of interest to the user and send the object identity information to the server 106 and the server 106 may retrieve from the digital content storage 107 and return to the mobile device 104 the digital content associated with the physical object of interest.

In one or more embodiments, the aforesaid coordinate system is set up for the whole environment (e.g. museum, shop, home) so that each object 103 in the scene can be located. The user can associate any digital multimedia contents with any physical objects 103, such as by leaving notes on different physical objects 103 to interact with other users. In one or more embodiments, the coordinate system in the environment is implemented by periodically projecting a sequence of gray code, so that each pixel of the projected area has a unique coordinate. The projection rate is very high that each pixel can be located, for example, 80 times per second. For comparison, while building computer vision based interactive system (either using webcamera or Kinect), typically the frame rate is set to 30/60 frames per second (FPS), therefore such systems can at most locate 30/60 times per second.

In one or more embodiments, the described computerized system and the computer-implemented method for associating digital content with various physical objects and subsequently retrieving and/or updating the associated digital content has two operating modes: a content association operating mode used by users called content producers and a content retrieval operating mode used by users called content consumers. It should be noted that in certain applications, the content producers and content consumers may be the same group of users. In various embodiments, the described systems and methods enable the content producer to associate the digital content with various physical objects in the environment in accordance with two methods: 1) a centralized view method and 2) a distributed method.

Centralized View Content Association Method

Figure 2:
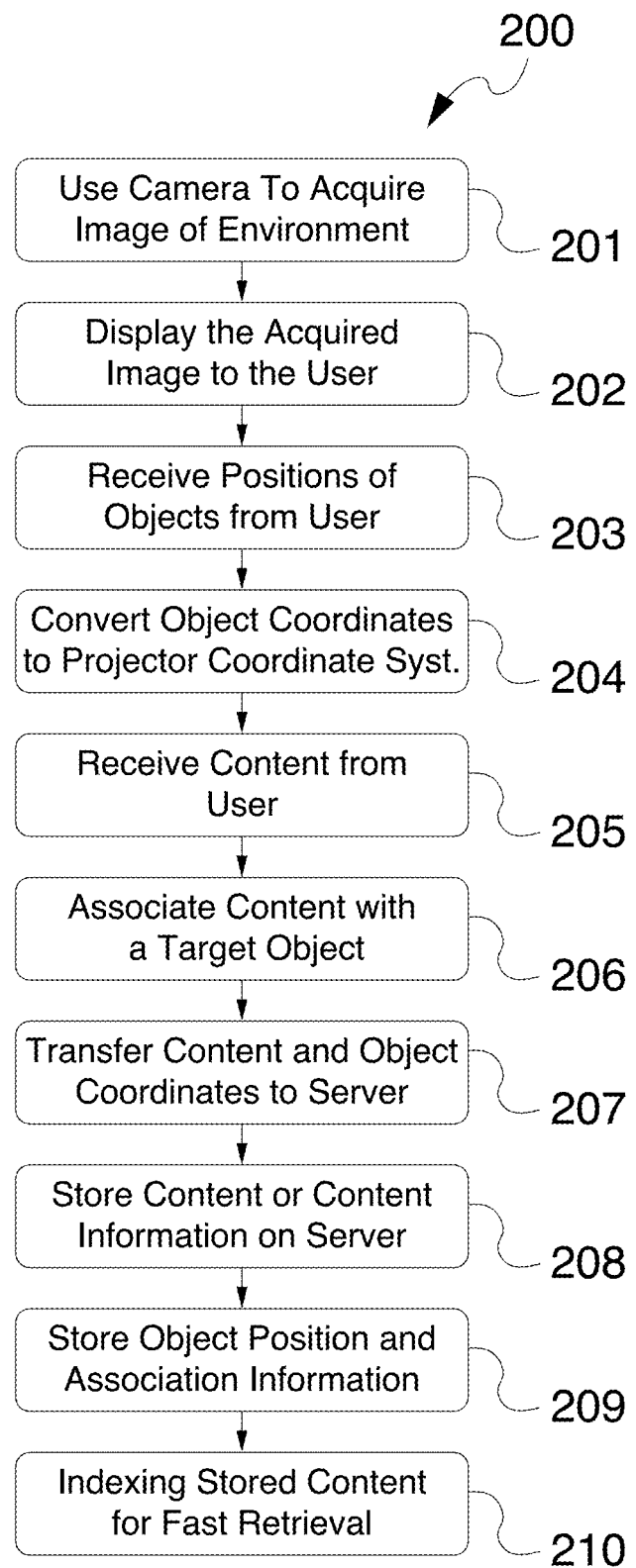
FIG. 2 illustrates an exemplary embodiment of a centralized view method for associating digital content with physical objects.

FIG. 2 illustrates an exemplary embodiment of the centralized view method 200 for associating digital content with physical objects. At step 201, a camera is used to acquire an image of the environment with physical objects 103. In one or more embodiments, the camera is co-located with the projector 101 and may be a web camera or any other type of electronic image acquisition device. At step 202, the image of the environment acquired by the camera is displayed to the user using a graphical user interface generated on a display device, such as a computer monitor. At step 203, the graphical user interface receives the user-designated positions of the physical objects on the camera image shown to the user. To this end, the user uses the mouse or other cursor control device to mark the positions of specific objects on the shown image.

At step 204, the object designation information specified by the user is processed by converting the object coordinates from the camera view coordinate system into projector coordinate system in accordance with coordinate system convention information. In one or more embodiments, the calibration of the coordinate system conversion function and generation of the aforesaid coordinate system convention information is performed only once. In one or more embodiments, this is done by having the user click on the corners of the image area corresponding to the area of the environment illuminated by the projector 101 and specify the resolution of the projector 101. Based on the user's selection and the specified projector resolution, the system automatically calculates the appropriate coordinate system conversion formula coefficients.

At step 205, the user is provided with a user interface for selecting or otherwise designating digital content to be associated with the designated physical object. In various embodiments, the user may be provided with a graphical user interface form for typing the textual content, a file browsing user interface for selecting one or more digital media files from user's computer or an interface for receiving designation of one or more digital content objects available online using, for example, corresponding URLs. Upon receiving the designation of the digital content, the system associates the received digital content with the target object at step 206.

At step 207, the physical object position information and the associated digital content or the digital content location information (such as URL) are transferred via network to the server 106. At step 208, the server stores the digital content or the digital content location information in the content storage 107. At step 209, the physical object position information as well as the association information between the digital content and the physical object position are also stored by the server 106. In one or more embodiments, at step 210, the stored digital content may be indexed in the content storage 107 for fast retrieval.

Distributed Content Association Method

Figure 3:
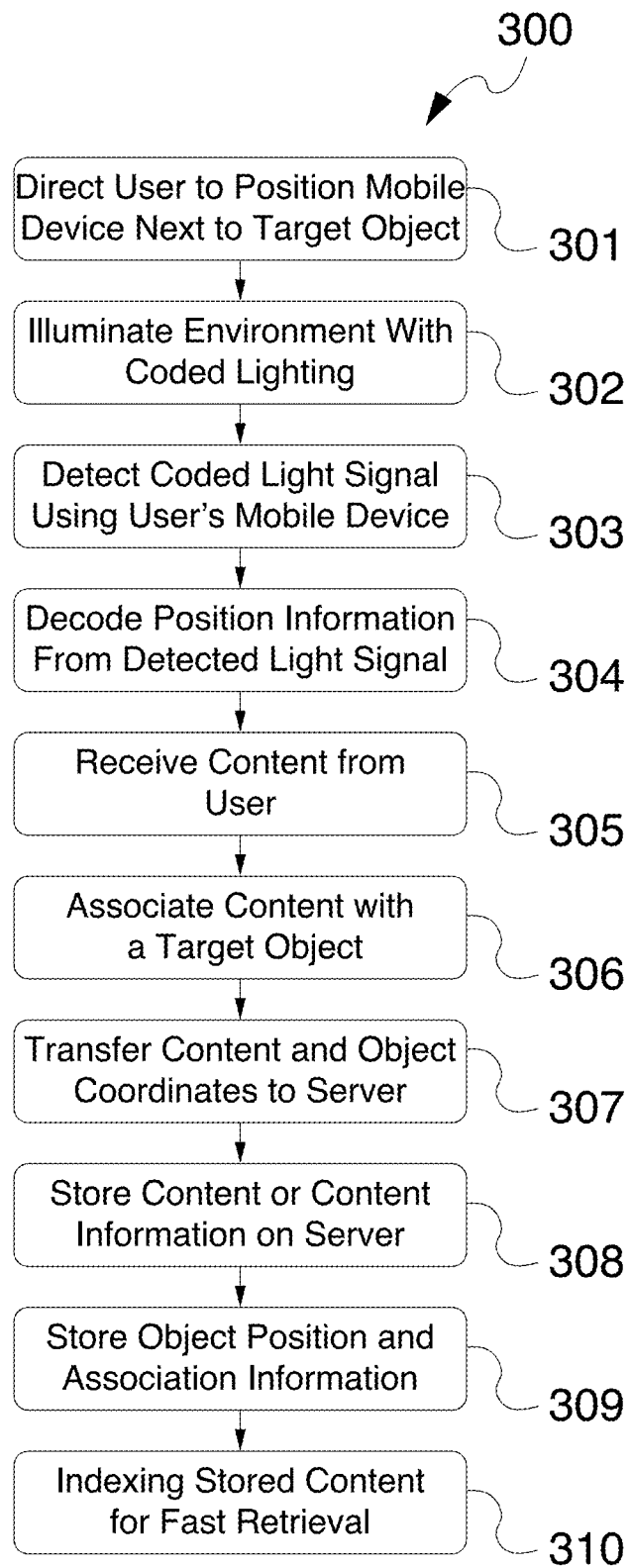
FIG. 3 illustrates an exemplary embodiment of a distributed method for associating digital content with physical objects.

FIG. 3 illustrates an exemplary embodiment of the distributed method 300 for associating digital content with physical objects. At step 301, the user is directed to position the mobile device 104 with the light sensor in the proximity of the target physical object 103. At step 302, the projector 101 is used to illuminate the environment with a coded lighting. At step 303, the coded lighting from the projector 101 is received by the light sensor of the mobile device 104. At step 304, the position module of the mobile device 104 decodes the mobile device position information from the received coded light signal. At step 305, the user is provided with a user interface for selecting or otherwise designating digital content to be associated with the designated physical object position. In various embodiments, the user may be provided with a graphical user interface form for typing the textual content, a file browsing user interface for selecting one or more digital media files from user's mobile device or an interface for receiving designation of one or more digital content objects available online using, for example, corresponding URLs. Upon receiving the designation of the digital content, the software operating on the user's mobile device associates the received digital content with the position of the target object at step 306.

At step 307, the physical object position information and the associated digital content or the digital content location information (such as URL) are transferred via network to the server 106. At step 308, the server stores the digital content or the digital content location information in the content storage 107. At step 309, the physical object position information as well as the association information between the digital content and the physical object position are also stored by the server 106. In one or more embodiments, at step 310, the stored digital content may be indexed in the content storage 107 for fast retrieval.

Content Retrieval Method

Figure 4:
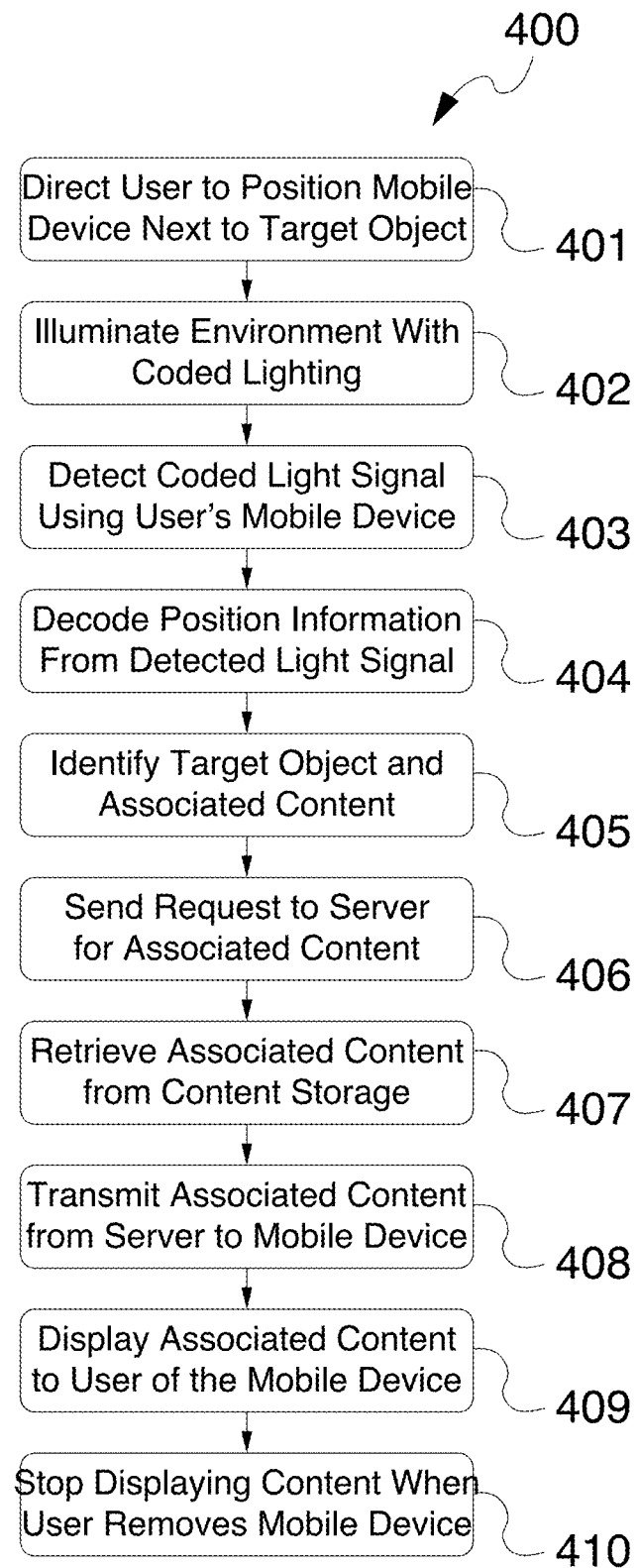
FIG. 4 illustrates an exemplary embodiment of a method for retrieving digital content associated with physical objects.

FIG. 4 illustrates an exemplary embodiment of the method 400 for retrieving digital content associated with physical objects. At step 401, the user is directed to position the mobile device 104 with the light sensor in the proximity of the target physical object 103. At step 402, the projector 101 is used to illuminate the environment with a coded lighting. At step 403, the coded lighting from the projector 101 is received by the light sensor of the mobile device 104. At step 404, the position module of the mobile device 104 decodes the mobile device position information from the received coded light signal. Subsequently, at step 405, the mobile application executing on the mobile device 104 identifies the object of interest to the user as well as the location of the associated digital content based on the previously received environment configuration information.

At step 406, the mobile device 104 sends a request, such as an HTTP request, containing the location information of the associated digital content to the server 106. Upon receiving the request with the associated digital content location information, at step 407, the server 106 retrieves the digital content associated with the respective physical object. At step 408, the server 106 sends a response to the mobile device 104 containing the retrieved content. At step 409, the received content is displayed to the user on the display unit of the mobile device 104. At step 410, the mobile device 104 detects that the user moved the mobile device away from the target object and stops displaying the digital content to the user.

Content Updating Method

Figure 5:
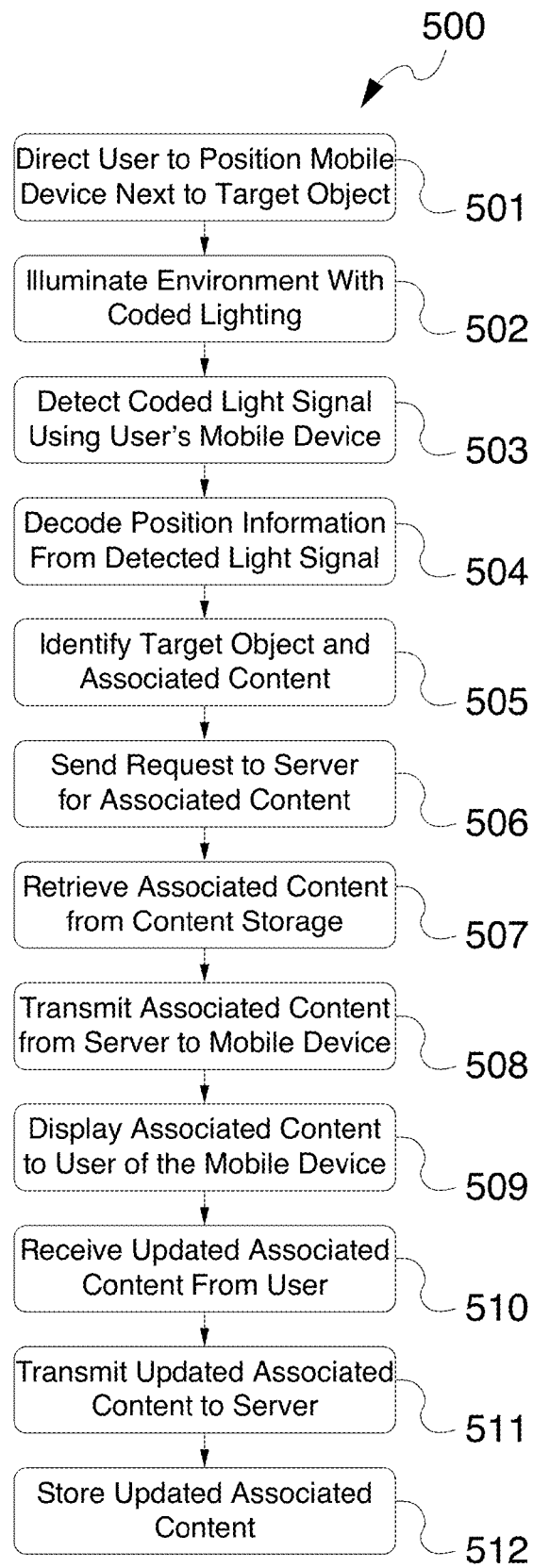
FIG. 5 illustrates an exemplary embodiment of a method for retrieving and updating digital content associated with physical objects.

FIG. 5 illustrates an exemplary embodiment of the described method 500 for retrieving and updating digital content associated with physical objects. At step 501, the user is directed to position the mobile device 104 with the light sensor in the proximity of the target physical object 103. At step 502, the projector 101 is used to illuminate the environment with a coded lighting. At step 503, the coded lighting from the projector 101 is received by the light sensor of the mobile device 104. At step 504, the position module of the mobile device 104 decodes the mobile device position information from the received coded light signal. Subsequently, at step 505, the mobile application executing on the mobile device 104 identifies the object of interest to the user as well as the location of the associated digital content based on the previously received environment configuration information.

At step 506, the mobile device 104 sends a request, such as an HTTP request, containing the location information of the associated digital content to the server 106. Upon receiving the request with the associated digital content location information, at step 507, the server 106 retrieves the digital content associated with the respective physical object. At step 508, the server 106 sends a response to the mobile device 104 containing the retrieved content. At step 509, the received content is displayed to the user on the display unit of the mobile device 104.

At step 510, the user is provided with a user interface for updating the displayed digital content. In various embodiments, the user may be provided with a graphical user interface form for typing the updated textual content, a file browsing user interface for selecting one or more new digital media files from user's computer or an interface for receiving designation of one or more updated digital content objects available online using, for example, corresponding URLs. At step 511, the updated digital content or the digital content location information (such as URL) are transmitted via network to the server 106. At step 512, the server stores the updated digital content or the updated digital content location information in the content storage 107. In one or more embodiments, at step 513, the stored updated digital content may be re-indexed in the content storage 107 for fast retrieval.

Various specific applications of the described computerized system and a computer-implemented method for associating digital content with various physical objects and subsequently retrieving and/or updating the associated digital content will now be described.

Museum Assistant Application

Due to the limited space and other limiting factors, the artworks exhibited in a museum normally have no or very limited associated textual or audio-visual information. While viewing the exhibited artworks, many people may desire to receive additional information about the author, his life story, other works, etc. Such information needs to be presented to the user only when the user is in the near spatial proximity to the specific artwork. Accordingly, the described computerized system and a computer-implemented method for associating digital content with various physical objects and subsequently retrieving and/or updating the associated digital content has been adopted to implement a "Museum Assistant" application to providing users with contextual information on artworks displayed in a museum setting.

The aforesaid "Museum Assistant" application represents the embodiment of the described content association and retrieval system that has three characters: 1) once the digital content is associated with physical objects, it is not frequently updated (the museum exhibition layout usually would not change until the entire exhibition is replaced); 2) the hidden digital content mainly flows from the content producer (museum/exhibition manger) to the consumer (visitors); and 3) the content association process does not have to be performed around the physical object (e.g. artwork). Considering the above three aspects, the centralized view method 200 shown in FIG. 2 is used for associating digital content with the physical objects in a museum setting.

Figure 6:
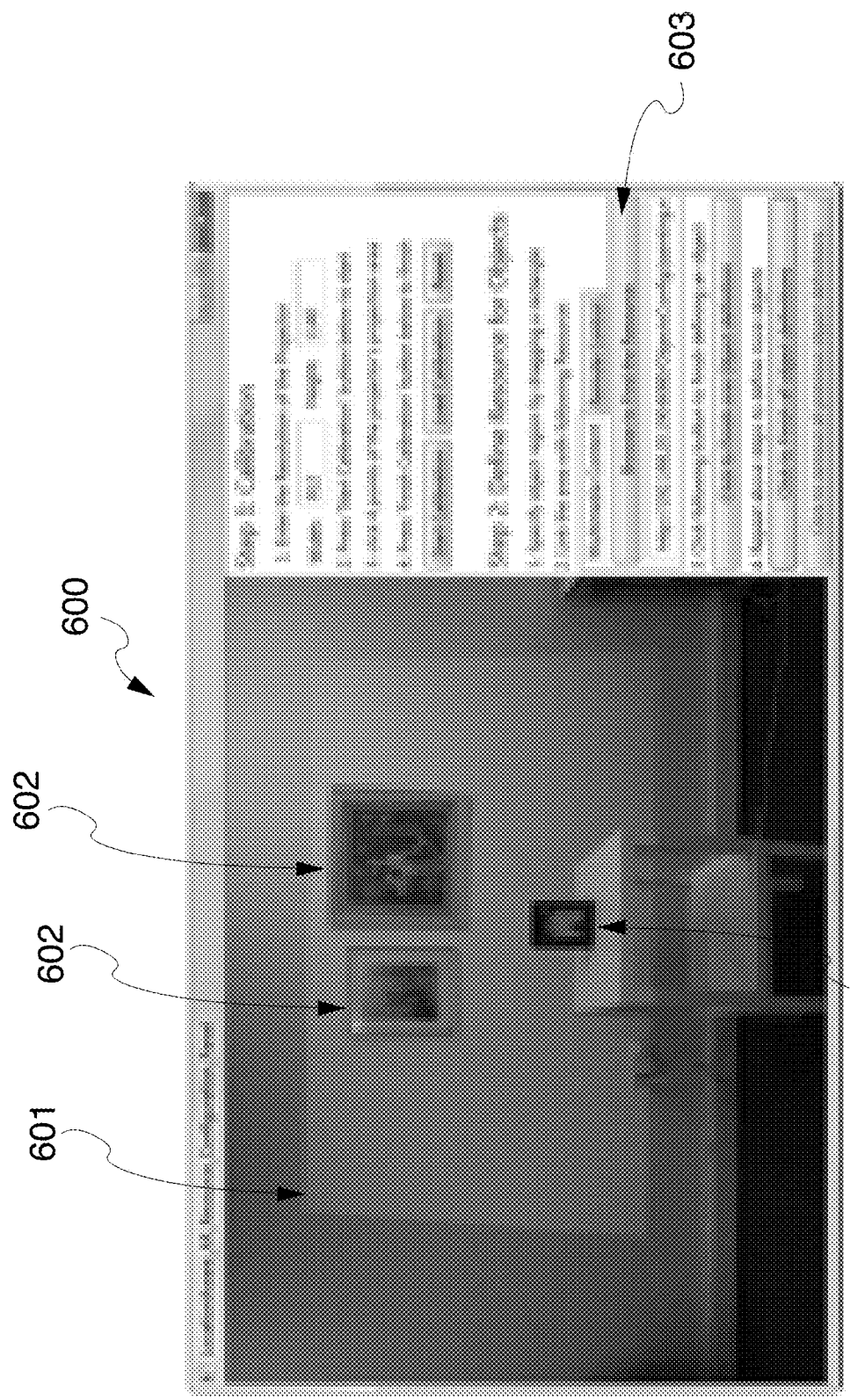
FIG. 6 illustrates an exemplary embodiment of a graphical user interface for performing association of a digital content with physical objects using the centralized view method shown in FIG. 2.

FIG. 6 illustrates an exemplary embodiment of a graphical user interface 600 for performing association of the digital content with the physical objects using the centralized view method 200 shown in FIG. 2. Specifically, the museum staff member uses the graphical user interface 600 for associating textual or audiovisual content, such as information about the author of the artwork, with the selected artwork (physical object). Once associated using the graphical user interface 600, the corresponding textual or audiovisual content is loaded into the content storage 107 and the positions of the artworks are specified by the museum staff and stored by the server 106 in the environment configuration file. As explained above, the coordinate system calibration step is used to map the coordinate system of the camera view into the corresponding coordinate system of the projector 101. The museum worker (content producer) only needs to input the resolution of the projector 101 and to click on the four corners of the area 601 illuminated by the projector 101. As stated above, it is done only once because the positions of the physical objects and the projector stay mostly unchanged.

After the aforesaid calibration step, the content producer uses the graphical user interface 600 shown in FIG. 6 to draw rectangles to define the physical object areas, see rectangles 602 shown in FIG. 6. Subsequently, by clicking the "Browse to Find Resource" button 603 on the graphical user interface 600, the content producer can select the digital content he or she wants to be associated with the specific physical object. In one or more embodiments, the object area information and digital contents are linked together as a JavaScript Object Notation (JSON) string well known to persons of ordinary skill in the art. After associating all objects of interest with their respective digital content, all the corresponding information is transmitted to the server 106, for example as a JSON array, which represents the configuration of the environment. In one or more embodiments, the JSON array format is designed for easy transfer and interpretation of the environment configuration information by a client application executing on the mobile device 104.

The following is an exemplary embodiment of the environment configuration file:

```
[
{"type":"VIDEO",
"mmurl":"http://192.168.20.190:8080/ObjectConfig/
NotreDame.mp4", "tl_x":127, "tl_y":44,
"br_x":321,"br_y":166
},
{"type":"TXT",
"mmurl":"http://192.168.20.190:8080/ObjectConfig/
MulanStory.txt", "tl_x":642, "tl_y":206,
"br_x":864, "br_y":338
}
]
```

The exemplary environment configuration file shown above incorporates definitions of two physical objects, with each definition appearing inside sets of brackets ({ }). The "type" record refers to the type of the digital content: "VIDEO" means digital content is video, while "TXT" means text. "tl_x", "tl_y", "br_x" and "br_y" are top-left and bottom right corner coordinates, which define the affective area of the physical object. "mmurl" contains the URL link to the resource. It should be noted that the above environment configuration file shown is exemplary only and may other file formats could be utilized to store and exchange environment configuration information without departing from the scope and spirit of the invention. Therefore, the invention is not limited to the disclosed file format or content.

In one or more embodiments, on the server side 106, there are provided several "JavaServer Pages" (JSP), which can receive the aforesaid environment configuration files from the content producer and also provide them to the content consumer in a dynamic manner. Such configuration of the server 106 makes the content updates easy. Whenever the content producer updates the content, it is immediately reflected on the server 106, and therefore the content consumer can always get the latest environment configuration.

When the mobile application is launched on the mobile device 104, it is configured to first send a request, such as an HTTP request, for the update-to-date environment configuration file from the web server. Once the application obtains the environment configuration file from the server 106, it possesses information on the position (area) of each physical object (tl_x, tl_y, br_x, br_y). As the user moves the mobile device 104 in the environment, the light sensor incorporated into the mobile device 104 reads the time sequence of the light values generated by the projector 101. The position module incorporated into the mobile device 104 decodes the position (x,y) of the mobile device 104 based on the detected sequence of the light values and the environment configuration file received from the server 104. This can be done in real time at up to 80 times per second.

Based on the decoded position information, the mobile application executing on the mobile device 104 determines which physical object area is the closest to the mobile device 104 by comparing the positions of all physical object areas in the environment configuration file to the detected position of the mobile device 104. Once the target physical object area is identified, the mobile application uses the identifier of the corresponding physical object to retrieve the associated digital content through the URL associated with the corresponding physical object identifier as described in the environment configuration file.

Figure 7:
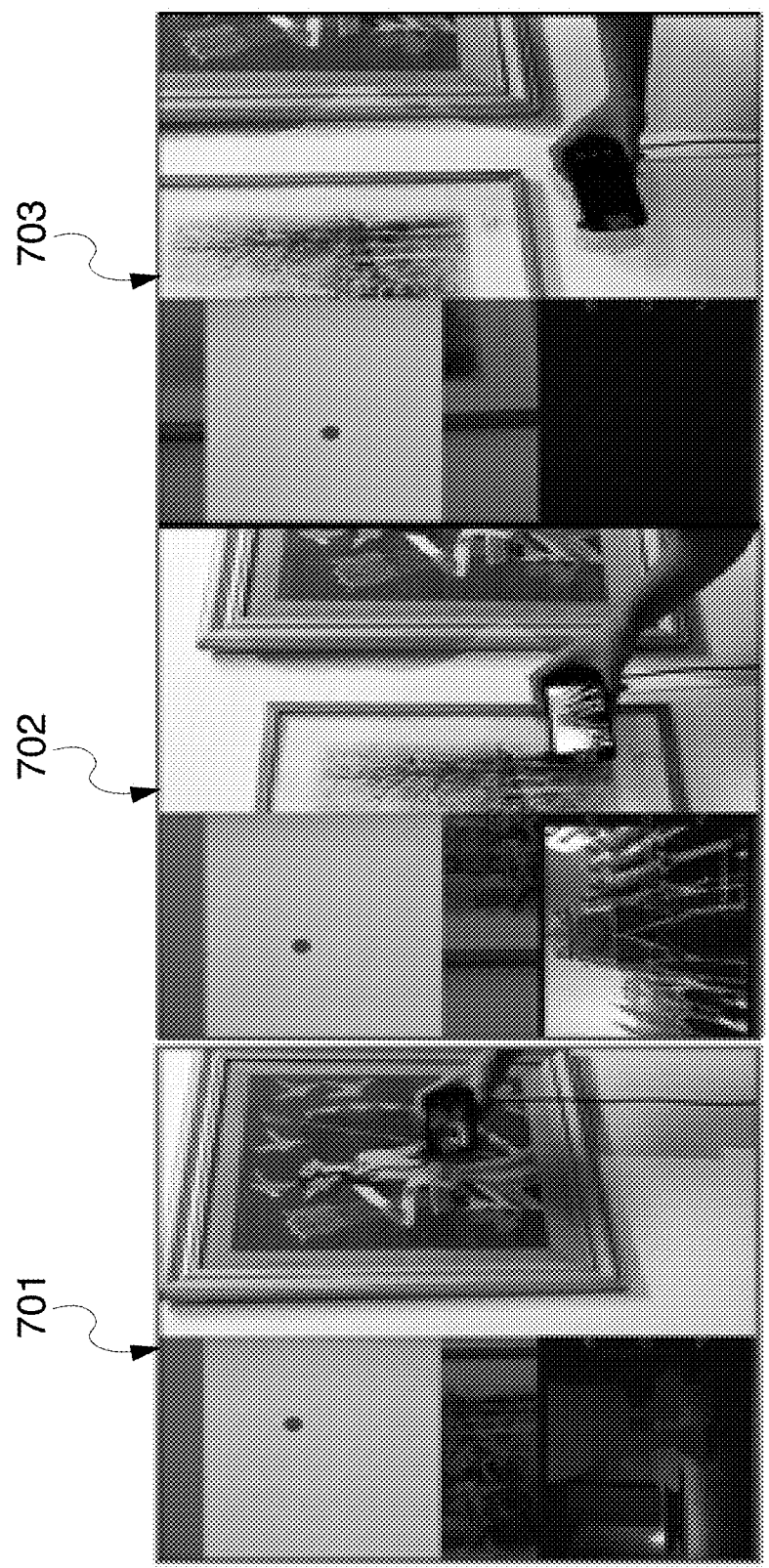
FIG. 7 illustrates an exemplary user experience in connection with a museum assistant mobile application.

The resultant user experience is illustrated in connection with FIG. 7. Two artworks are hanged on the wall: The right one is of a heroine called "Mulan" in ancient China and the left one is a sketch of "Notre Dame de Paris". Both artworks have no textual content or other additional information for visitors to use. The described content association and retrieval system enables the museum worker (content producer) to associate additional digital content (in this case a video) with each artwork for museum visitors to retrieve.

When the museum visitor wants to learn more about the "Mulan", he or she takes out his mobile phone and positions it close to the painting to indicate his or her interest. Subsequently, the mobile application running on the user's mobile phone detects the projector's coded light signal, retrieves the associated digital content and starts a real-time video streaming playback on the user's mobile phone, see 701 in FIG. 7. The user then moves to the "Notre Dame de Paris" and similarly indicates his or her interest in additional information about this artwork by positioning the mobile phone in the proximity of the painting. Upon detection of the position based on the coded lighting, the mobile application starts playing a video stream related to the corresponding painting, see 702 in FIG. 7. When the user is no longer interested in this extra information, he or she simply puts the mobile phone away and the mobile application immediately stops the video playback, see 703 in FIG. 7. The described user experience provided by the embodiments of the content association and retrieval system meets the design requirement of the Museum Assistant system, wherein the digital content should be shown in a non-intrusive way, which means that the content is shown only when the user is interested in viewing such content.

Indoor Plant/Fish Care-Giving Application

Indoor plants and pets require extensive human care. However, it might not be easy for family members to coordinate their care-giving schedule. For example, when a member of a family wants to feed the fish, he does not know whether the fish has been recently fed and may have to call to ask other family members. Similarly, when a family member does not have time to water the plant and inform other members to do so, other family members may forget to do it even though they are physically around the plant.

An indoor plant/fish care-giving application represents an exemplary deployment of the described content association and retrieval system that requires information sharing among a group of people. Specifically, to enable the coordination of the care giving efforts by multiple users, the described content association and retrieval system may be applied to share care-related information (notes or messages) among different users. As the care-giving efforts of the users are directed to specific animals or plants, the care-related content is most conveniently associated with the corresponding target animals or plants when the user is located in the immediate physical proximity thereto. Accordingly, the distributed method 300 for associating digital content with the physical objects shown in FIG. 3 is more preferable for this specific application. Because the digital content producer and consumer are both from the same group of people (they are all care-giving family members), both the content association function and the content retrieval function should be made available for each system user.

Figure 8:
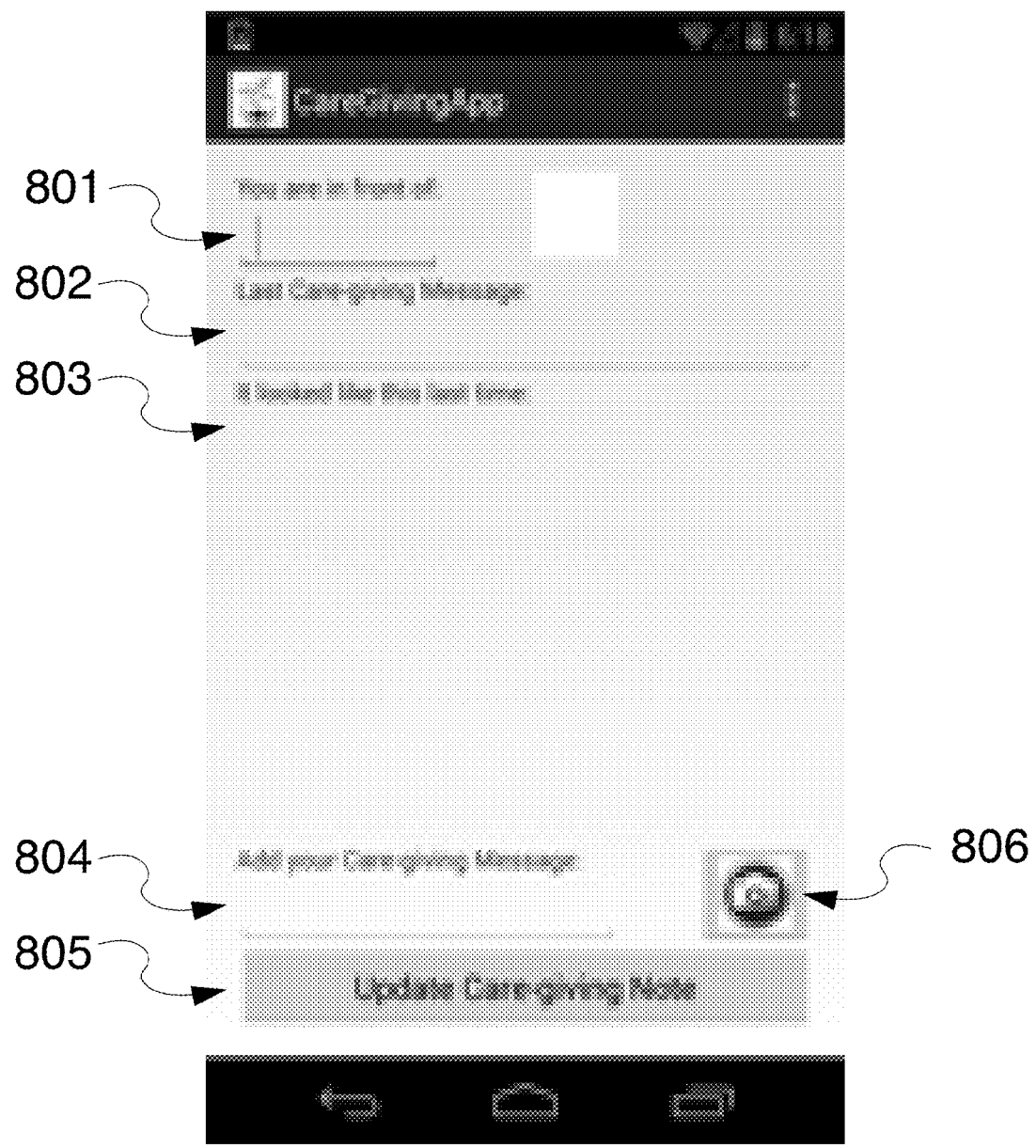
FIG. 8 illustrates an exemplary embodiment of a user interface of a mobile application for coordinating care-giving activities amount a group of users.

FIG. 8 illustrates an exemplary embodiment of a user interface 800 of a mobile application for coordinating care-giving activities amount a group of users. As shown in FIG. 8, the users can view messages left by other users and add their own messages. In FIG. 8, the first three fields 801, 802 and 803 are associated with the digital content retrieval function: digital content will be retrieved and shown when the user is in the proximity of the target physical object. The field 801 ("You are in front of:") will show the name of the physical object (e.g. plant/fish) when user is in the immediate proximity of that object. The field 802 ("Last Care-giving Message:") will display the message left by the previous member who took care of the physical object. The field 803 ("It looked like this last time:") will display the picture of the physical object when the previous care giving action took place. The last two fields 804 and 805 of the user interface 800 are related to the content association function: the user can use these fields to leave his or her own messages for other group members. The field 804 ("Add your Care-giving Message:") can be used to add text messages for other users. The field 805 ("Camera Button") is used to take a picture of physical object's current appearance. Finally, by activating the button 806 ("Update Care-giving Note"), the new message(s) and/or image(s) are transmitted via the network to the server 106 in the aforesaid JSON array format, which can be subsequently retrieved by other family members.

As would be appreciated by persons of ordinary skill in the art, textual information (e.g. care-giving textual messages) are easily packed directly into the JSON format environment configuration file. However, the pictures that the users may take are impossible to directly pack into the environment configuration file. In one or more embodiments, a two-phase transfer strategy is designed to solve this issue. In the first phase, the metadata of the picture (e.g. file name) is packed with all care-giving text messages into the c environment configuration file and is sent to the server 106. In the second phase, the raw image data is sent to a predetermined folder on the same server 106 or in the content storage 107. Subsequently, when another user starts her mobile application, the mobile application will first send an HTTP request to fetch the JSON formatted environment configuration file from the server 106 and then extracts the name of the corresponding image, and finally uses that name to retrieve the image itself under the predetermined folder on the server 106.

As would be appreciated by persons of skill in the art, the mobile application executing on the mobile device 104 of the user needs to determine which object the user is currently interacting with. To this end, in one embodiment, each physical object has a fixed effective circle area. Only when the user (actually user's mobile device) moves into that area, the corresponding messages will be displayed. In one embodiment, the system enables the users to draw the effective areas of various physical objects by using their mobile phones.

Figure 9:
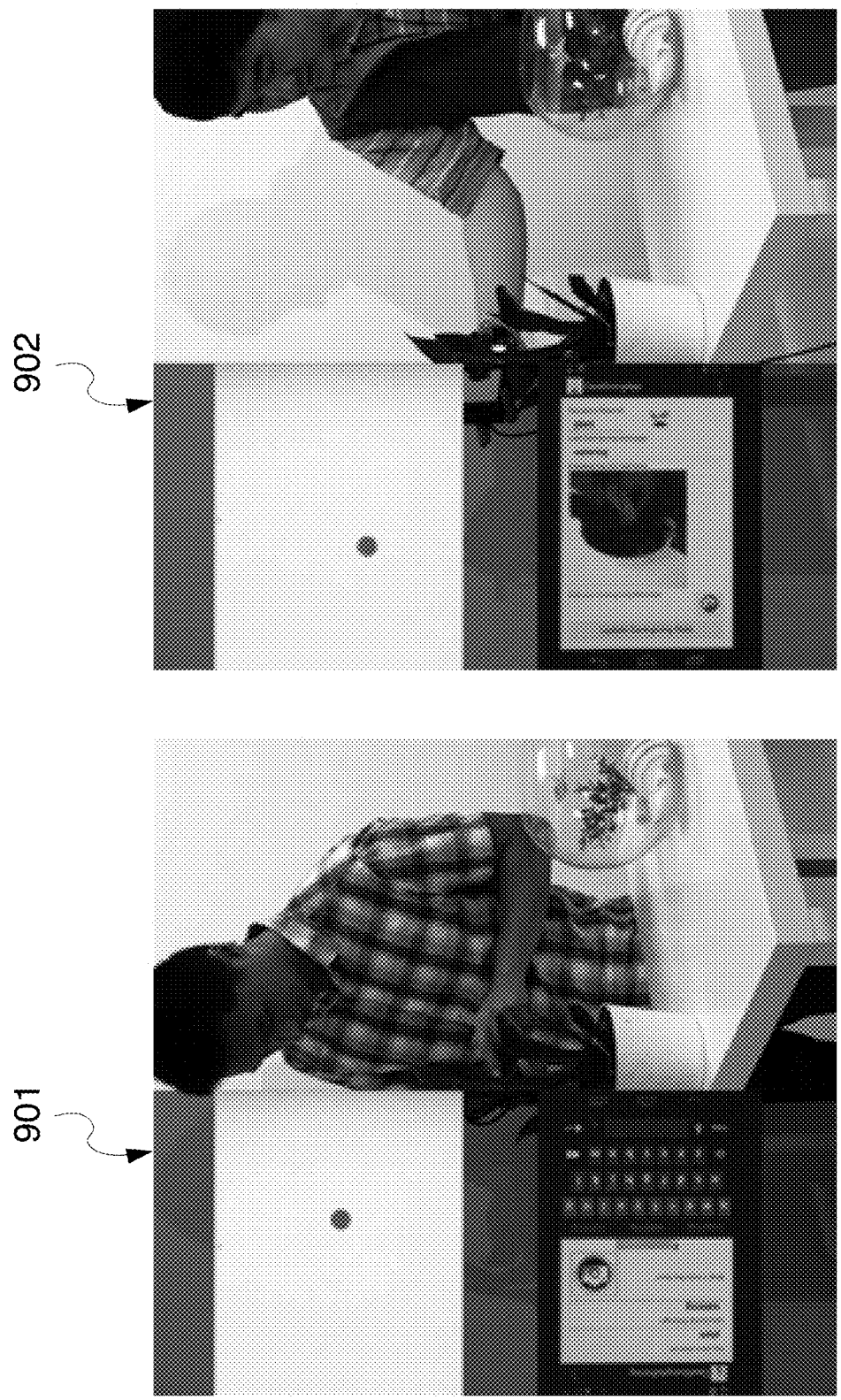
FIG. 9 illustrates an exemplary user experience in connection with an indoor plant/fish care-giving application.

The resultant user experience is shown in FIG. 9. After watering the plant, user A leaves a message of what he did and takes a picture of the plant at that time, see 901 of FIG. 9. Subsequently, another user comes to check the status of the plant, moves his mobile phone close the plant, and the messages and pictures form the previous user(s) are immediately displayed on the user's mobile device, see 902 in FIG. 9.

Shopping Assistant Application

Associating digital content with items in stores to help customer make a purchasing decision is another example of a deployment of an embodiment of the described content association and retrieval system. Using the conventional visual object recognition for this purpose is not feasible for the majority of items, such as clothing, as different items of clothing lack identical texture. On the other hand, because the described coded-lighting based localization approach does not rely on the appearance of the physical objects, an embodiment of the inventive content association and retrieval system described herein can be successfully applied to provide shoppers with information in a store setting.

As in the Museum Assistant application described above, in the Shopping Assistant Application, the digital content mainly flows in one direction: from the shop manager to the customer. Therefore, two different mobile applications are used for associating the content and retrieving it. The graphical user interfaces of the aforesaid mobile applications for associating and retrieving the content are illustrated in FIGS. 10 and 11, respectively.

Figure 10:
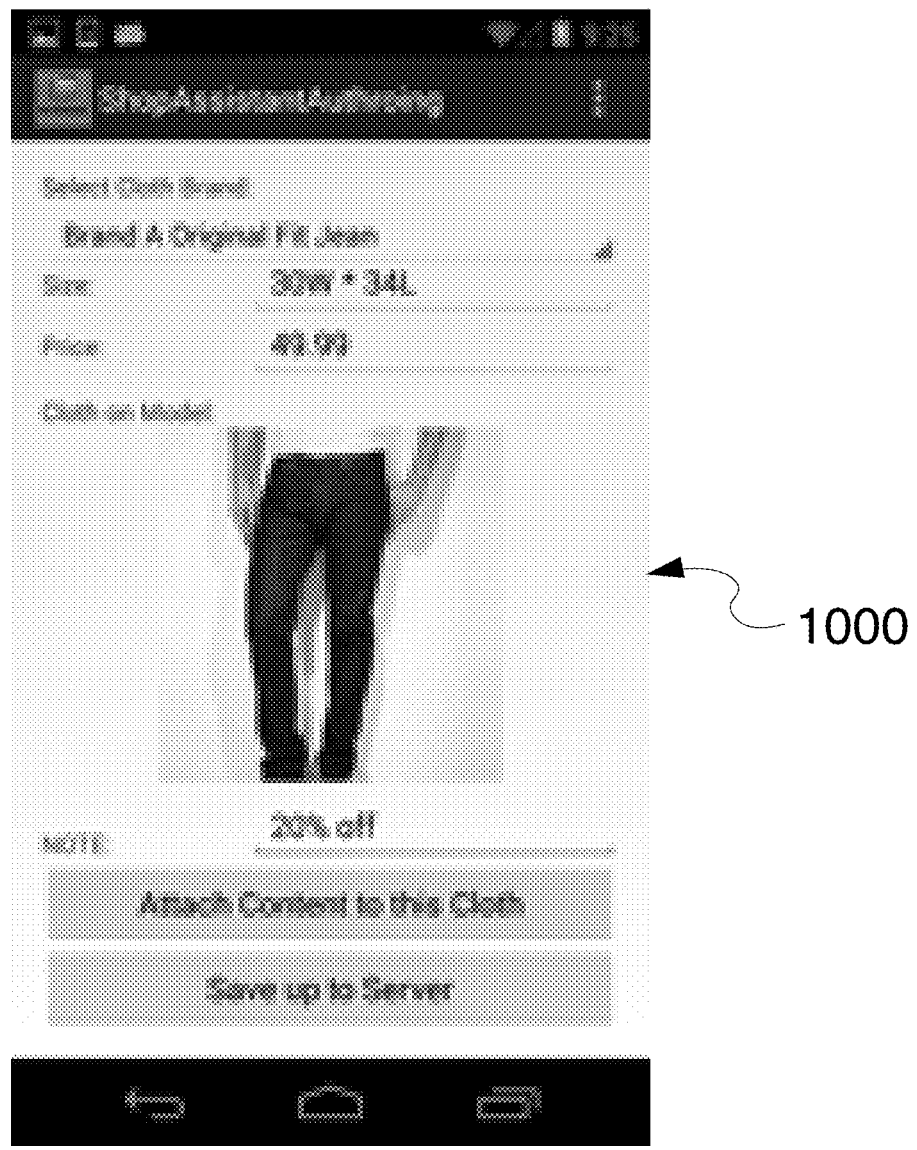
FIG. 10 illustrates an exemplary embodiment of a graphical user interface for associating product information with store items.
Figure 11:
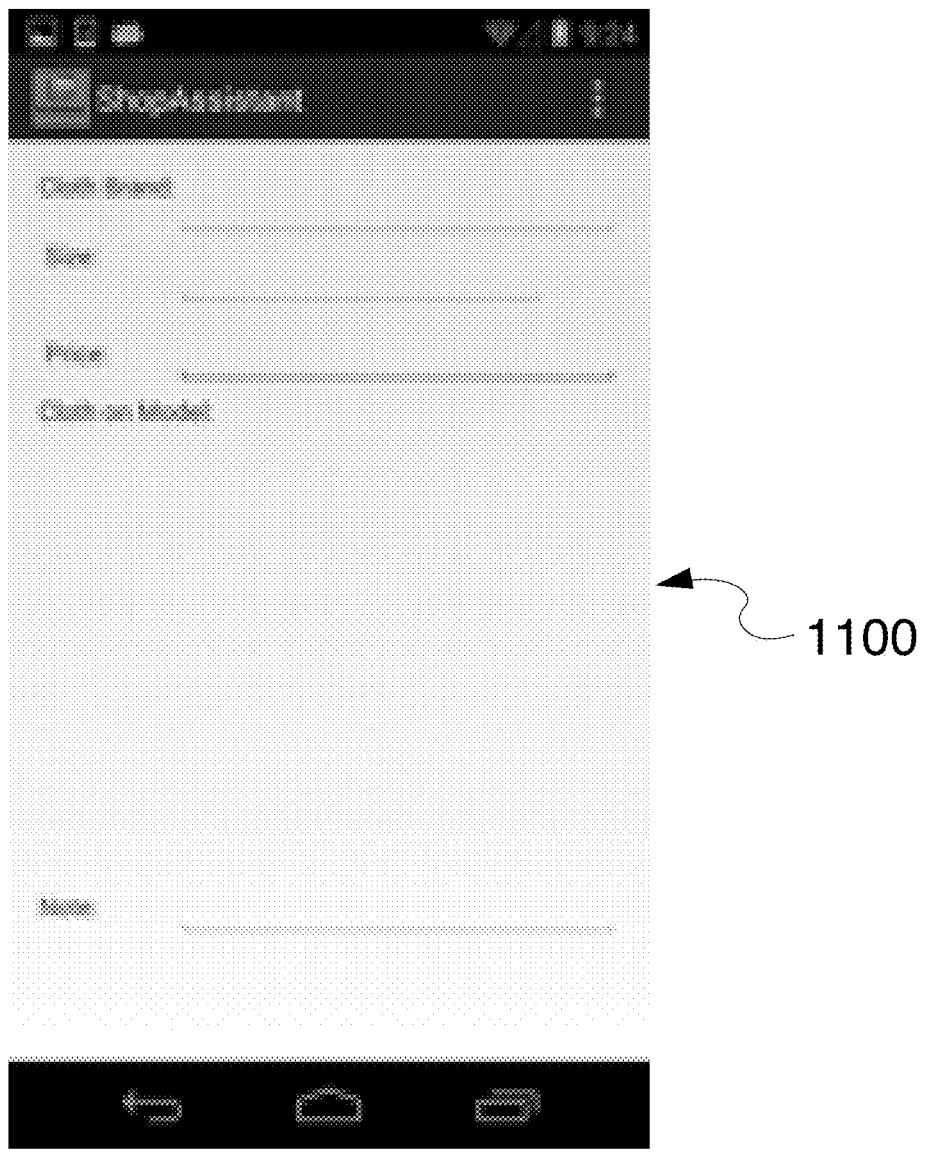
FIG. 11 illustrates an exemplary embodiment of a user interface of a shopping assistant mobile application.

Specifically, the graphical user interface 1000 shown in FIG. 10 is used by the store staff to associate product information with store items. Exemplary types of information that can be associated with physical items for sale using the graphical user interface 1000 include, without limitation, brand, size, price, type of cloth or other material and discount information. The received information about each item for sale is stored on the server 106 and/or in content storage 107. Subsequently, the shopper can use an instance of a graphical user interface 1100 shown in FIG. 11, to retrieve the item-related information input by the store manager when the customer is in the store in the immediate proximity to the target physical item.

Peephole View Application

Figure 12:
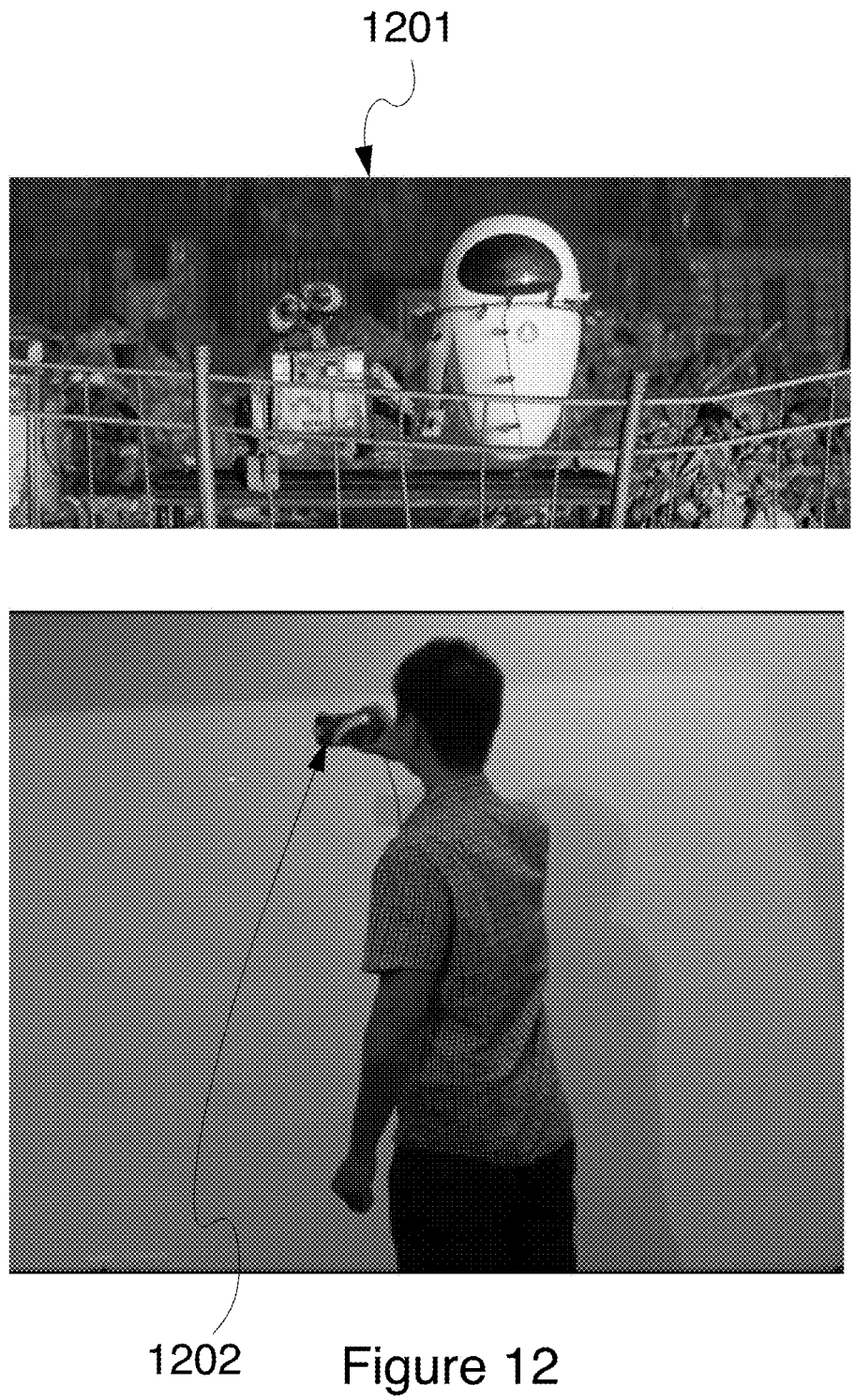
FIG. 12 illustrates an exemplary user experience in connection with a peephole view mobile application.

Because the described embodiments of the content association and retrieval system can achieve pixel-level resolution, the embodiments of the described system can be used to implement many fine-grained user interactions. An exemplary embodiment of such an interaction is a peephole view. In this application, a user may view a large image through a mobile device screen, which acts similarly to a peephole. FIG. 12 shows the whole image 1201 and the part 1202 seen through a mobile phone screen. With this approach, a user may align and hide detailed information in an environment without changing the environment's physical appearance. More specifically, a user may use this technology to explore, for example, a 3D map for civilian or military applications. Users may also use this technology to explore a factory model. Because these maps and models are much smaller than the corresponding physical objects, a fine-grained interaction is used to reveal detailed information on each small region of the physical object.

Exemplary Embodiments of System Hardware

Figure 13:
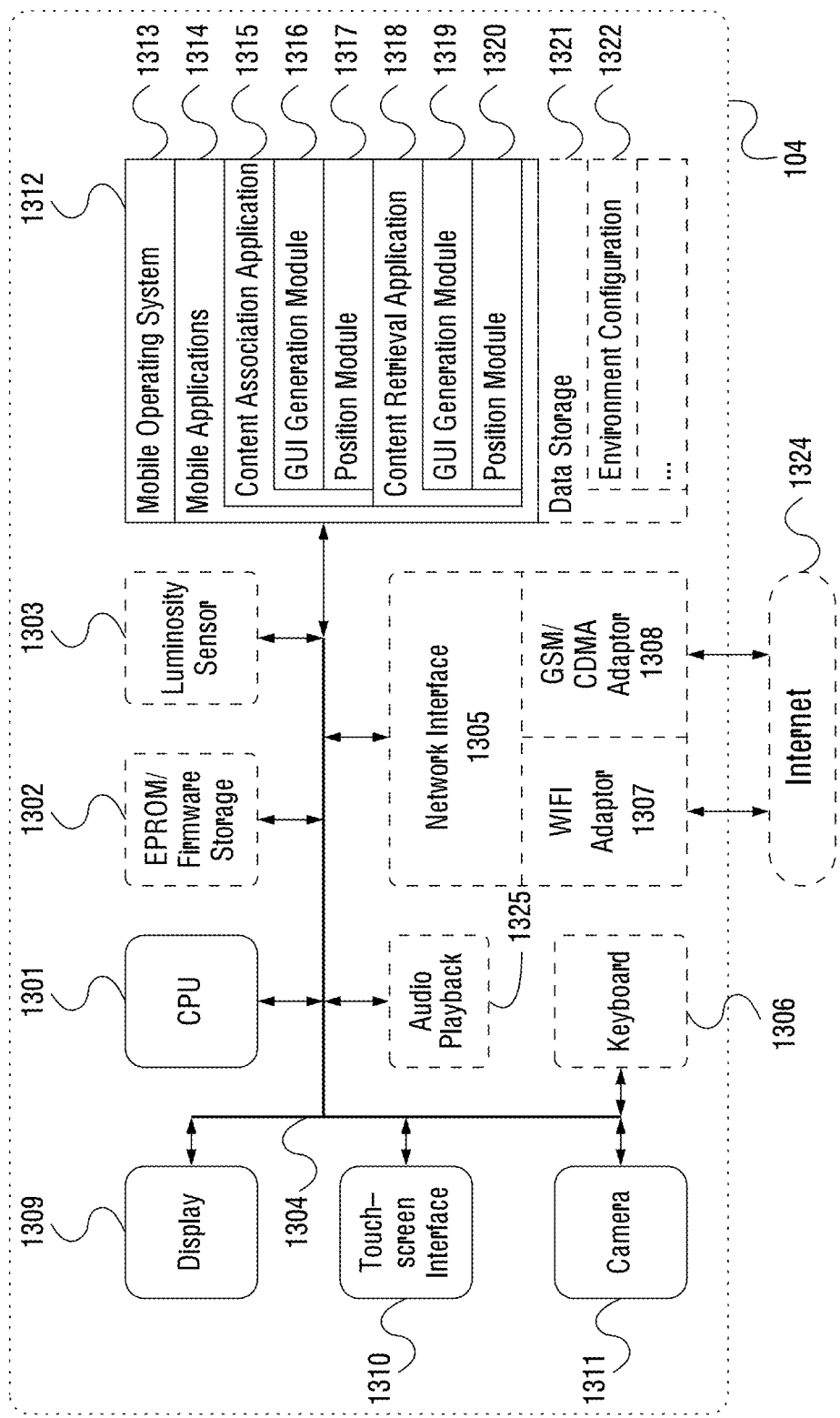
FIG. 13 illustrates an exemplary embodiment of a computerized mobile system for associating digital content with physical object and subsequently retrieving the associated digital content.

FIG. 13 illustrates an exemplary embodiment of a computerized mobile system 104 for associating digital content with physical object and subsequently retrieving the associated digital content. In one or more embodiments, the computerized system 104 may be implemented within the form factor of a mobile computing device, such as a smartphone, a personal digital assistant (PDA), or a tablet computer, all of which are available commercially and are well known to persons of skill in the art. In an alternative embodiment, the computerized system 104 may be implemented based on a laptop or a notebook computer. Yet in an alternative embodiment, the computerized system 104 may be an embedded system, incorporated into an electronic device with certain specialized functions, such as a web television receiving device configured to receive television broadcast digital video stream and display it to the user. Yet in an alternative embodiment, the computerized system 104 may be implemented as a part of an augmented reality head-mounted display (HMD) systems, also well known to persons of ordinary skill in the art.

The computerized system 104 may include a data bus 1304 or other interconnect or communication mechanism for communicating information across and among various hardware components of the computerized system 104, and a central processing unit (CPU or simply processor) 1301 coupled with the data bus 1304 for processing information and performing other computational and control tasks. Computerized system 104 also includes a memory 1312, such as a random access memory (RAM) or other dynamic storage device, coupled to the data bus 1304 for storing various information as well as instructions to be executed by the processor 1301. The memory 1312 may also include persistent storage devices, such as a magnetic disk, optical disk, solid-state flash memory device or other non-volatile solid-state storage devices.

In one or more embodiments, the memory 1312 may also be used for storing temporary variables or other intermediate information during execution of instructions by the processor 1301. Optionally, computerized system 104 may further include a read only memory (ROM or EPROM) 1302 or other static storage device coupled to the data bus 1304 for storing static information and instructions for the processor 1301, such as firmware necessary for the operation of the computerized system 104, basic input-output system (BIOS), as well as various configuration parameters of the computerized system 104.

In one or more embodiments, the computerized system 104 may incorporate a display device 1309, which may be also coupled to the data bus 1304, for displaying various information to a user of the computerized system 104. In an alternative embodiment, the display device 1309 may be associated with a graphics controller and/or graphics processor (not shown). The display device 1309 may be implemented as a liquid crystal display (LCD), manufactured, for example, using a thin-film transistor (TFT) technology or an organic light emitting diode (OLED) technology, both of which are well known to persons of ordinary skill in the art. In various embodiments, the display device 1309 may be incorporated into the same general enclosure with the remaining components of the computerized system 104. In an alternative embodiment, the display device 1309 may be positioned outside of such enclosure.

In one or more embodiments, the display device 1309 may be implemented in a form of a projector or a mini-projector configured to project information on various objects, such as glasses worn by the user. In one or more embodiments, the display device 1309 may be configured to be mountable on the head of the user. To this end, the display device 1309 may be provided with suitable mounting hardware (not shown).

In one or more embodiments, the computerized system 104 may further incorporate an audio playback device 1325 connected to the data bus 1304 and configured to play various audio files and streams, such as MPEG-3 files, or audio tracks of various video files, such as MPEG-4 files, well known to persons of ordinary skill in the art. To this end, the computerized system 104 may also incorporate waive or sound processor or a similar device (not shown). In the described specific embodiments, the audio playback device 1325 is configured to play to the user the live audio stream of the video conference.

In one or more embodiments, the computerized system 104 may incorporate one or more input devices, such as a touch-screen interface 1310 for receiving tactile commands of the video conference participants, a camera 1311 for acquiring still images and video of the conference participant and/or various objects, as well as a keyboard 1306, which all may be coupled to the aforesaid data bus 1304 for communicating information, including, without limitation, images and video, as well as user command selections to the processor 1301. In an alternative embodiment, input devices may include a system for tracking eye movements of the user (not shown), which may be used to indicate to the computerized system 104 the command selection made by the video conference participant.

In one or more embodiments, the computerized system 104 may additionally include a luminosity sensor 1303 for detecting the coded light signal generated by the projector 101. In one embodiment, the luminosity sensor 1303 has a fast response time to provide for high frequency position detection.

In one or more embodiments, the computerized system 104 may additionally include a communication interface, such as a network interface 1305 coupled to the data bus 1304. The network interface 1305 may be configured to establish a connection between the computerized system 104 and the Internet 1324 using at least one of WIFI interface 1307 and the cellular network (GSM or CDMA) adaptor 1308. The network interface 1305 may be configured to provide a two-way data communication between the computerized system 104 and the Internet 1324. The WIFI interface 1307 may operate in compliance with 802.11a, 802.11b, 802.11g and/or 802.11n protocols as well as Bluetooth protocol well known to persons of ordinary skill in the art. In an exemplary implementation, the WIFI interface 1307 and the cellular network (GSM or CDMA) adaptor 1308 send and receive electrical or electromagnetic signals that carry digital data streams representing various types of information.

In one or more embodiments, the Internet 1324 typically provides data communication through one or more sub-networks to other network resources. Thus, the computerized system 104 is capable of accessing a variety of network resources located anywhere on the Internet 1324, such as remote media servers, web servers, other content servers as well as other network data storage resources. In one or more embodiments, the computerized system 104 is configured send and receive messages, media and other data, including application program code, through a variety of network(s) including Internet 1324 by means of the network interface 1305. In the Internet example, when the computerized system 104 acts as a network client, it may request code or data for an application program executing on the computerized system 1300. Similarly, it may send various data or computer code to other network resources.

In one or more embodiments, the computerized system 104 uses the network interface 1305 to send request(s), via the Internet 1324, such as HTTP requests, to the server 106 and receive the environment configuration file(s) and the digital content associated with physical objects therefrom.

In one or more embodiments, the functionality described herein is implemented by computerized system 104 in response to processor 1301 executing one or more sequences of one or more instructions contained in the memory 1312. Such instructions may be read into the memory 1312 from another computer-readable medium. Execution of the sequences of instructions contained in the memory 1312 causes the processor 1301 to perform the various process steps described herein. In alternative embodiments, hard-wired circuitry may be used in place of or in combination with software instructions to implement the embodiments of the invention. Thus, embodiments of the invention are not limited to any specific combination of hardware circuitry and software.

The term "computer-readable medium" as used herein refers to any medium that participates in providing instructions to processor 1301 for execution. The computer-readable medium is just one example of a machine-readable medium, which may carry instructions for implementing any of the methods and/or techniques described herein. Such a medium may take many forms, including but not limited to, non-volatile media and volatile media.

Common forms of non-transitory computer-readable media include, for example, a floppy disk, a flexible disk, hard disk, magnetic tape, or any other magnetic medium, a CD- ROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read. Various forms of computer readable media may be involved in carrying one or more sequences of one or more instructions to processor 1301 for execution. For example, the instructions may initially be carried on a magnetic disk from a remote computer. Alternatively, a remote computer can load the instructions into its dynamic memory and send the instructions over the Internet 1324. Specifically, the computer instructions may be downloaded into the memory 1312 of the computerized system 104 from the foresaid remote computer via the Internet 1324 using a variety of network data communication protocols well known in the art.

In one or more embodiments, the memory 1312 of the computerized system 104 may store any of the following software programs, applications or modules:

1. Operating system (OS) 1313, which may be a mobile operating system for implementing basic system services and managing various hardware components of the computerized system 104. Exemplary embodiments of the operating system 1313 are well known to persons of skill in the art, and may include any now known or later developed mobile operating systems.

2. Mobile applications 1314 may include, for example, a set of software applications executed by the processor 1301 of the computerized system 104, which cause the computerized system 104 to perform certain predetermined functions, such as detect the encoded light signal using the luminosity sensor 1303 and/or display the associated digital content on the display device 1309. In one or more embodiments, the mobile applications 1314 may include an inventive digital content association application 1315, or an inventive digital content retrieval application 1318 described in detail below.

3. Data storage 1321 may be used, for example, for storing the environment configuration file 1322 described in detail above.

In one or more embodiments, the inventive digital content association application 1315 may incorporate a graphical user interface generation module 1316 configured to generate an inventive graphical user interface for associating digital content with physical objects as well as the position module 1317 for determining the position information based on the coded light signal received by the luminosity sensor 1303 and the contents of the environment configuration file 1322 stored in the data storage 1321.

In one or more embodiments, the inventive digital content retrieval application 1318 may incorporate a graphical user interface generation module 1319 configured to generate an inventive graphical user interface for displaying the retrieved digital content associated with physical objects as well as the position module 1320 for determining the position information based on the coded light signal received by the luminosity sensor 1303 and the contents of the environment configuration file stored in the data storage 1321.

Figure 14:
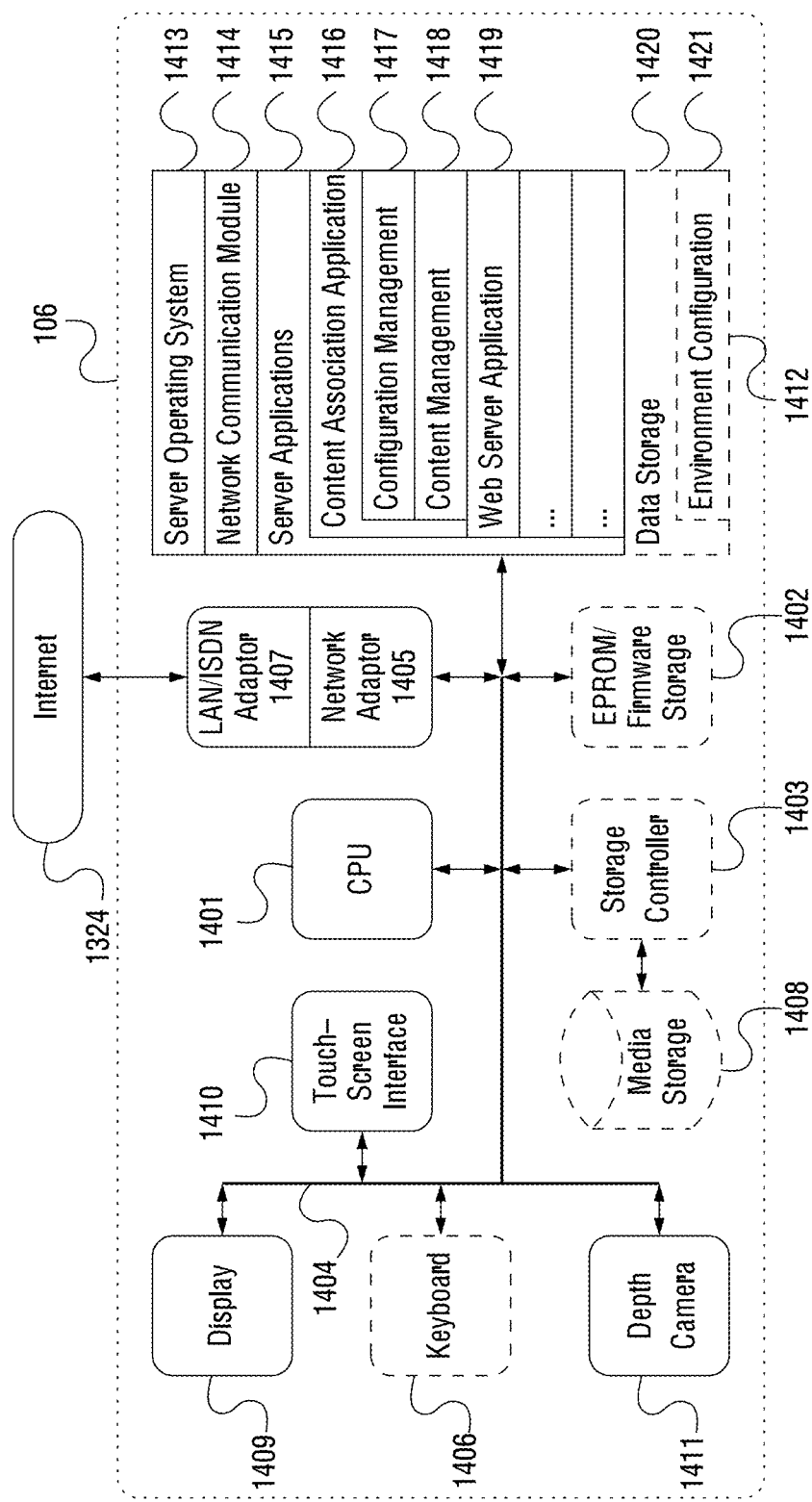
FIG. 14 illustrates an exemplary embodiment of a computerized server system for facilitating association and retrieval of digital content with physical objects.

FIG. 14 illustrates an exemplary embodiment of a computerized server system 106 for facilitating association and retrieval of digital content with physical objects. In one or more embodiments, the computerized server system 106 may incorporate a data bus 1404, which may be substantially similar and may perform substantially similar functions as the data bus 1304 of the computerized system 104 illustrated in FIG. 13. In various embodiments, the data bus 1404 may use the same or different interconnect and/or communication protocol as the data bus 1304. The one or more processors (CPUs) 1401, the network adaptor 1405, the EPROM/Firmware storage 1402, the display device 1409 and the keyboard 1406 of the computerized server system 104 may be likewise substantially similar to the respective processor 1301, the network interface 1305, the EPROM/Firmware storage 1302, the display device 1309 and the keyboard 1306 of the computerized system 104, except that the former components are deployed in a server platform configuration. In various implementations, the one or more processor 1401 may have substantially increased processing power as compared with the processor 1301.

In addition to the input device 1406 (keyboard), the computerized server system 106 may additionally include a cursor control device 1410, such as a mouse, a trackball, or cursor direction keys for communicating direction information and command selections to processor 1401 and for controlling cursor movement on the display device 1409. This input device typically has two degrees of freedom in two axes, a first axis (e.g., x) and a second axis (e.g., y), that allows the device to specify positions in a plane.

The LAN/ISDN adaptor 1407 of the computerized server system 106 may be implemented, for example, using an integrated services digital network (ISDN) card or a modem to provide a data communication connection to a corresponding type of telephone line, which is interfaced with the Internet 1324 using Internet service provider's hardware (not shown). As another example, the LAN/ISDN adaptor 1407 may be a local area network interface card (LAN NIC) to provide a data communication connection to a compatible LAN and the Internet 1324. To store various media files, the computerized server system 106 may be provided with a media storage 107 connected to the data bus 1404 by means of a storage controller 1403.

In one or more embodiments, the memory 1412 of the computerized server system 106 may store any of the following software programs, applications or modules:

1. Server operating system (OS) 1413, which may be an operating system for implementing basic system services and managing various hardware components of the computerized server system 106. Exemplary embodiments of the server operating system 1413 are all well known to persons of skill in the art, and may include any now known or later developed operating systems.

2. Network communication module 1414 may incorporate, for example, one or more network protocol stacks which are used to establish a networking connection between the computerized server system 106 and the various network entities of the Internet 1324, such as the computerized system 104, using the network adaptor 1405 working in conjunction with the LAN/ISDN adaptor 1407.

3. Server applications 1415 may include, for example, a set of software applications executed by one or more processors 1401 of the computerized server system 106, which cause the computerized server system 106 to perform certain predetermined functions or tasks. In one or more embodiments, the server applications 1415 may include an inventive content association and storage application 1416. In one or more embodiments, the content association and storage application 1416 may incorporate an environment configuration management module 1417 for managing the environment configuration files described in detail above. The content association and storage application 1416 may additionally include a continent management module 1418 for receiving the content over the network from the computerized system 104, storing the received content in the content storage 107, retrieving the content from the content storage and providing the content to the computerized system 104. Finally, the server applications 1415 may include a web server application 1419 for handling HTTP requests from the computerized system 104.

4. Data storage 1420 may be used, for example, for storing the environment configuration files 1421 described in detail hereinabove.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, Objective-C, perl, shell, PHP, Java, as well as any now known or later developed programming or scripting language.

Moreover, other implementations of the invention will be apparent to those skilled in the art from consideration of the specification and practice of the invention disclosed herein. Various aspects and/or components of the described embodiments may be used singly or in any combination in the systems and methods for associating digital content with physical objects and retrieving the previously associated digital content. It is intended that the specification and examples be considered as exemplary only, with a true scope and spirit of the invention being indicated by the following claims.

What is claimed is:

1. A computer-implemented method performed in connection with a computerized system comprising a processing unit, a network interface, a memory and a projector, the computer-implemented method comprising:
   a. designating, based on an instruction received from a user, an area within an illumination field of the projector, wherein the area corresponds to a non-electronically controlled physical object;
   b. using the projector to project a light encoded with coordinate information, wherein the light encoded with the coordinate information is projected within the illumination field of the projector;
   c. receiving a content or a content information from the user;
   d. associating, using the processing unit, the physical object within the illumination field of the projector with the content or the content information received from the user;
   e. detecting the light encoded with the coordinate information using a mobile device remote from the projector and positioned within the illumination field of the projector;
   f. determining a position of the mobile device within the illumination field of the projector based on the detected light encoded with the coordinate information; and
   g. causing, on condition that the determined position of the mobile device is within the designated area, the mobile device to display the associated content.

2. The computer-implemented method of claim 1, wherein the designated area corresponds to a physical object located within the illumination field of the projector and wherein the associated content is related to the physical object.

3. The computer-implemented method of claim 2, wherein the physical object is an artwork and wherein the associated content is related to the artwork.

4. The computer-implemented method of claim 2, wherein the physical object is a plant or an animal and wherein the associated content is related to caring for the plant or the animal.

5. The computer-implemented method of claim 2, wherein the physical object is an article offered for sale and wherein the associated content comprises sales information related to the article.

6. The computer-implemented method of claim 1, wherein the content information comprises a location of the content.

7. The computer-implemented method of claim 1, wherein the light encoded with the coordinate information comprises, for each pixel or a group of pixels of the projector, a timed sequence of light pulses, the sequence of the light pulses being encoded the coordinate information of the corresponding pixel or the corresponding group of pixels.

8. The computer-implemented method of claim 1, wherein the light encoded with the coordinate information is detected using a camera of the mobile device.

9. The computer-implemented method of claim 1, wherein the light encoded with the coordinate information is detected using a luminosity sensor disposed on or about the mobile device.

10. The computer-implemented method of claim 1, wherein designating the area comprises placing a second mobile device within the area within the illumination field of the projector, detecting the light encoded with the coordinate information using the second mobile device, and designating the area based on the detected light encoded with the coordinate information.

11. The computer-implemented method of claim 1, wherein designating the area comprises acquiring an image of the illumination field of the projector using a camera, displaying the acquired image to the user and receiving from the user a selection of the designated area within the illumination field of the projector.

12. The computer-implemented method of claim 11, wherein designating the area further comprises converting a position of the designated area in a first coordinate system of the camera into the position of the designated area in the a second coordinate system of the projector.

13. The computer-implemented method of claim 1, further comprising storing information on the designated area and the associated content information in an environment configuration file.

14. The computer-implemented method of claim 13, further comprising transmitting the environment configuration file to the mobile device.

15. The computer-implemented method of claim 1, further comprising, based on a second instruction received from the user, updating the content or the content information associated with the designated area.

16. The computer-implemented method of claim 15, wherein updating the content or the content information associated with the designated area comprises receiving from a second mobile device an updated environment configuration file and storing the received updated environment configuration file.

17. The computer-implemented method of claim 1, further comprising repeatedly additionally determining the position of the mobile device and causing the mobile device to stop displaying the associated content when the determined position of the mobile device is outside of the designated area.

18. A non-transitory computer-readable medium embodying a set of computer-executable instructions, which, when executed in connection with a computerized system comprising a processing unit, a network interface, a memory and a projector having an illumination field, cause the computerized system to perform a method comprising:
- a. using the projector to project a light encoded with coordinate information indicative of a coordinate within the illumination field;
- b. storing, in the memory, a plurality of areas within the illumination field, wherein each area corresponds to a non-electronically controlled physical object being associated with a content;
- c. determining a position of a mobile device remote from the projector and positioned within the illumination field, by detecting the light and decoding the coordinate information encoded within the light; and
- d. causing, on condition that the position is within any of the plurality of areas, the mobile device to display the associated content.

19. A computerized system comprising a processing unit, a network interface, a projector and a memory storing a set of instructions, the set of instructions comprising instructions for:
- a. designating, based on an instruction received from a user, an area within an illumination field of the projector, wherein the area corresponds to a non-electronically controlled physical object;
- b. using the projector to project a light encoded with coordinate information, wherein the light encoded with the coordinate information is projected within the illumination field of the projector;
- c. receiving a content or a content information from the user;
- d. associating, using the processing unit, the physical object within the illumination field of the projector with the content or the content information received from the user;
- e. detecting the light encoded with the coordinate information using a mobile device remote from the projector and positioned within the illumination field of the projector;
- f. determining a position of the mobile device within the illumination field of the projector based on the detected light encoded with the coordinate information; and
- g. causing, on condition that the determined position of the mobile device is within the designated area, the mobile device to display the associated content.

\* \* \* \* \*